United States Patent
Richardson et al.

(10) Patent No.: US 11,495,934 B1
(45) Date of Patent: Nov. 8, 2022

(54) TAILORED LASER PULSE TRAINS FOR BURST-MODE ILLUMINATION

(71) Applicant: University of Central Florida Research Foundation, Inc., Orlando, FL (US)

(72) Inventors: Martin Richardson, Orlando, FL (US); Robert Bernath, Orlando, FL (US); Nathan Bodnar, Orlando, FL (US); Haley Kerrigan, Orlando, FL (US); Danielle Reyes, Orlando, FL (US); Daniel Thul, Orlando, FL (US); Jessica Pena, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 17/319,960

(22) Filed: May 13, 2021

Related U.S. Application Data

(60) Provisional application No. 63/024,137, filed on May 13, 2020.

(51) Int. Cl.
*H01S 3/00* (2006.01)
*H01S 3/10* (2006.01)
*H01S 3/23* (2006.01)

(52) U.S. Cl.
CPC ........ *H01S 3/0057* (2013.01); *H01S 3/10023* (2013.01); *H01S 3/10084* (2013.01); *H01S 3/2308* (2013.01)

(58) Field of Classification Search
CPC ............... H01S 3/0057; H01S 3/10023; H01S 3/10084; H01S 3/2308
See application file for complete search history.

(56) References Cited

U.S. PATENT DOCUMENTS

| | | | | |
|---|---|---|---|---|
| 3,302,120 A | * | 1/1967 | Kluver | ................... H01S 3/2316 359/339 |
| 2004/0017603 A1 | * | 1/2004 | Jay | ...................... H01S 3/06754 359/341.4 |

(Continued)

OTHER PUBLICATIONS

Barbieri et al., "Helical filaments" Appl. Phys. Lett. 104, 261109 (2014); https://doi.org/10.1063/1.4886960, Jul. 1, 2014, 6 pages.

(Continued)

*Primary Examiner* — Xinning (Tom) Niu
(74) *Attorney, Agent, or Firm* — Suiter Swantz pc llo

(57) ABSTRACT

A laser system may include one or more seed lasers to generate a pulsed seed beam including one or more laser pulses, a pulse pattern generator to generate an intermediate patterned burst-mode beam from at least one laser pulse from the pulsed seed beam, where the pulse pattern generator includes splits the at least one laser pulse from the pulsed seed beam along two or more delay paths and combines light along the two or more delay paths to a common optical path, and where the intermediate patterned burst-mode beam includes laser pulses with a selected pattern of inter-pulse spacings associated with the two or more delay paths. The laser system may further include power amplifiers to amplify the intermediate patterned burst-mode beam to form an amplified patterned burst-mode beam, where the amplified patterned burst-mode beam includes amplified laser pulses with the selected pattern of inter-pulse spacings.

44 Claims, 20 Drawing Sheets

(56) References Cited

U.S. PATENT DOCUMENTS

| | | | | |
|---|---|---|---|---|
| 2009/0097512 | A1* | 4/2009 | Clowes | H01S 3/108 |
| | | | | 372/21 |
| 2015/0146748 | A1* | 5/2015 | Kaganovich | G02B 26/001 |
| | | | | 372/25 |
| 2019/0072672 | A1* | 3/2019 | Yao | G01S 17/931 |
| 2021/0099020 | A1* | 4/2021 | Lane | H02J 50/30 |

OTHER PUBLICATIONS

Gao et al., "Femtosecond laser filament array generated with step phase plate in air." Opt Express. Feb. 25, 2013;21 (4):461 2-22. doi: 10.1364/OE.21.004612. PMID: 23481994., 11 pages.

Jhajj et al., (2014). Demonstration of Long-Lived High-Power Optical Waveguides in Air. Physical Review X. 4. 10.1103/PhysRevX. 4.011027. 8 pages.

Kerrigan et al., "Nanosecond laser coupling for increased filament ablation," Opt. Lett. 44, 2594-2597 (2019), pp. 2594-2597.

Kerrigan et al., (2019). Ultrafast diagnostics of augmented filament ablation., Proceedings of the SPIE, vol. 11051, id., 10.1117/12. 2524605. 5 pages.

Kudyshev et al., "Virtual hyperbolic metamaterials for manipulating radar signals in air.", Nat Commun 4, 2557 (2013). https://doi.org/10.1038/ncomms3557, 8 pages.

Ren et al., "Microwave guiding along double femtosecond filaments in air," Phys. Rev. E 88, 013104—Published Jul. 29, 2013, 5 pages.

Reyes et al., "Filament conductivity enhancement through nonlinear beam interaction," Opt. Express 28, 26764-26773 (2020), 10 pages.

Reyes et al., "Temporal stitching in burst-mode filamentation," J. Opt. Soc. Am. B 36, G52-G56 (2019), 5 pages.

Rohwetter et al., "Laser multiple filamentation control in air using a smooth phase mask." Phys. Rev. A.77. 10.1103/PhysRevA.77. 013812. (2008), 5 pages.

* cited by examiner

——— Signal
········· Backround

Single pulse white-light generation

Burst mode white-light generation

TAILORED LASER PULSE TRAINS FOR BURST-MODE ILLUMINATION

CROSS-REFERENCE TO RELATED APPLICATION

The present application claims the benefit under 35 U.S.C. § 119(e) of U.S. Provisional Application Ser. No. 63/024,137, filed May 13, 2020, entitled TAILORED LASER PULSE TRAINS FOR BURST-MODE ILLUMINATION, naming Martin Richardson, Robert Bernath, Nathan Bodnar, Haley Kerrigan, Danielle Reyes, Daniel Thul, and Jessica Pena as inventors, which is incorporated herein by reference in the entirety.

GOVERNMENT LICENSE RIGHTS

This invention was made with Government support under Grant No. FA9550-15-1-0041 awarded by the US Air Force Office of Scientific Research (AFOSR) and Grant No. W911NF1110297 awarded by the US Army RDECOM Acquisition Center. The Government has certain rights in this invention.

TECHNICAL FIELD

The present disclosure relates to pulsed lasers and, more particularly, to generating and utilizing tailored sequences of laser pulses for interactions with targets.

BACKGROUND

Ultrashort laser pulses are used in a wide range of industrial and research applications for their ability to induce nonlinear effects in many materials and generate filaments suitable for providing high-energy densities on a remote target. Further, the physics of the interaction of ultrashort pulses with a target or an atmosphere through which they propagate may differ for a single pulse relative to a burst of pulses. However, techniques for generating bursts of ultrashort laser pulses, particularly bursts of high-energy amplified laser pulses, typically suffer from limited achievable pulse energies due to ablation or phase modification in optical elements exposed to the laser pulses, or from inaccurate alignment of various constituent pulses in a burst that may severely limit long-distance applications. There is therefore a need to develop systems and methods for cure the above deficiencies.

SUMMARY

A laser system is disclosed in accordance with one or more illustrative embodiments of the present disclosure. In one illustrative embodiment, the laser system includes one or more seed lasers to generate a pulsed seed beam including one or more laser pulses. In another illustrative embodiment, the laser system includes a pulse pattern generator to generate an intermediate patterned burst-mode beam from at least one laser pulse from the pulsed seed beam, where the pulse pattern generator includes one or more beam splitters to split the at least one laser pulse from the pulsed seed beam along two or more delay paths and one or more beam combiners to combine light along the two or more delay paths to a common optical path, and where the intermediate patterned burst-mode beam includes a series of laser pulses with a selected pattern of inter-pulse spacings associated with the two or more delay paths. In another illustrative embodiment the laser system includes one or more power amplifiers to amplify the series of laser pulses in the intermediate patterned burst-mode beam to form an amplified patterned burst-mode beam, where the amplified patterned burst-mode beam includes a series of amplified laser pulses with the selected pattern of inter-pulse spacings.

A method is disclosed in accordance with one or more illustrative embodiments of the present disclosure. In one illustrative embodiment, the method includes generating a pulsed seed beam including one or more laser pulses using one or more seed lasers. In another illustrative embodiment, the method includes generating an intermediate patterned burst-mode beam from at least one laser pulse from the pulsed seed beam with a pulse pattern generator, where the pulse pattern generator includes one or more beam splitters to split the at least one laser pulse from the pulsed seed beam along two or more delay paths and one or more beam combiners to combine light along the two or more delay paths to a common optical path, and where the intermediate patterned burst-mode beam includes a series of laser pulses with a selected pattern of inter-pulse spacings associated with the two or more delay paths. In another illustrative embodiment, the method includes amplifying the series of laser pulses in the intermediate patterned burst-mode beam with one or more power amplifiers to form an amplified patterned burst-mode beam, where the amplified patterned burst-mode beam includes a series of amplified laser pulses with the selected pattern of inter-pulse spacings.

A method is disclosed in accordance with one or more illustrative embodiments of the present disclosure. In one illustrative embodiment, the method includes generating an amplified patterned burst-mode beam including a series of amplified laser pulses with a selected pattern of inter-pulse spacings, where the selected pattern of inter-pulse spacings corresponds to a Fourier transform of a selected radio-frequency spectrum. In another illustrative embodiment, the method includes illuminating a target with the amplified patterned burst-mode beam to generate the selected radio-frequency spectrum at the target.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
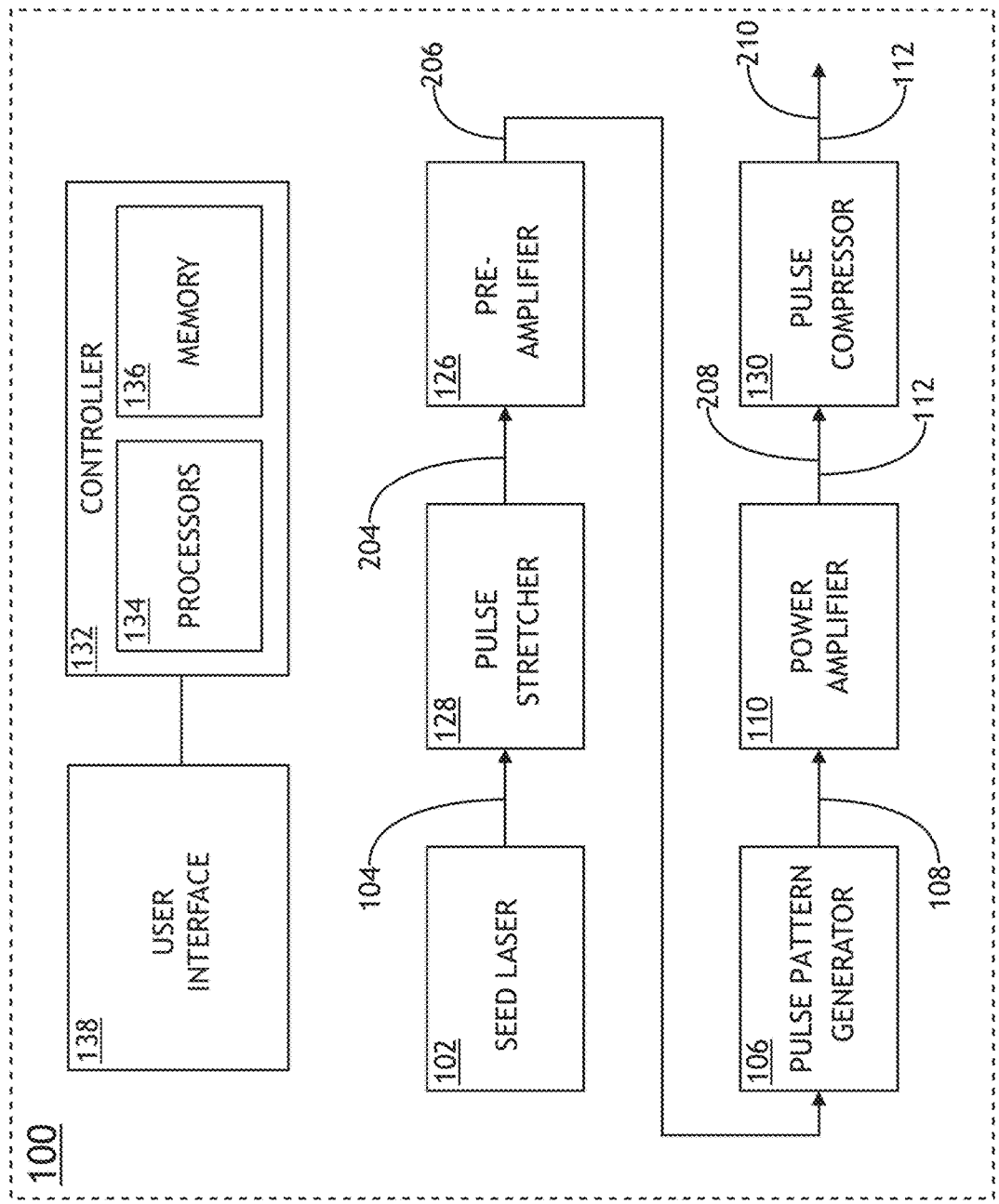
FIG. 1A is a block diagram illustrating a burst-mode laser system in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for generating tailored bursts of amplified laser pulses. In some embodiments, a tailored burst of amplified laser pulses may include a series or pattern of a selected number of amplified laser pulses, where the pulse amplitude of the component pulses and/or the inter-pulse spacings between any of the component pulses are tailored or otherwise selected. Further, a single tailored burst of amplified laser pulses may be provided or a series of tailored bursts (potentially each having different characteristics) may be provided.

The amplified laser pulses may generally have any pulse duration such as, but not limited to, durations on the order of nanoseconds, picoseconds, femtoseconds, or attoseconds. For example, some embodiments of the present disclosure are directed to the generation of tailored bursts of ultrafast laser pulses (or ultrashort laser pulses) having pulse durations on the order of picoseconds or shorter. By way of another example, some embodiments of the present disclosure are directed to systems and methods for generating bursts of pulses with varying durations such as, but not limited to, hybrid bursts including ultrashort pulses and nanosecond pulses.

The amplified laser pulses may generally have any pulse energy or associated peak power. For example, any particular amplified laser pulse may have any selected pulse energy including, but not limited to, a pulse energy on the order of microjoules to joules.

In some embodiments, the systems and methods disclosed herein may produce pulse envelopes or pulse bursts at a low repetition rate (e.g., 10 kHz or below), where each of these pulse bursts includes multiple higher repetition rate pulses (e.g., MHz, GHz, or the like). Further, any of these high repetition rate bursts may have bursts within them.

It is contemplated herein that systems and methods for providing tailored bursts of amplified laser pulses may enable a multitude of new application paradigms not possible with single pulses or uniform pulse trains including, but not limited to, light-matter interactions at close and long-range distances, plasma dynamics on or near a target material, or laser filamentation dynamics.

Some embodiments of the present disclosure are directed to burst-mode laser systems for the generation of tailored bursts of amplified laser pulses. In some embodiments, a burst-mode laser system is formed as a variant of a Master Oscillator Power Amplifier (MOPA) including a seed laser, a pulse pattern generator to generate an intermediate patterned burst-mode beam with tailored inter-pulse spacings and/or amplitudes, and one or more power amplifiers, where the pulse pattern generator is located between the seed laser and the one or more power amplifiers. For example, the pulse pattern generator may include one or more beamsplitters to split a pulse from the seed laser along two or more paths, time delays along the two or more paths that may optionally be adjustable, one or more beam combiners (e.g., beamsplitters), and one or more power amplifiers to amplify the intermediate patterned burst-mode beam generated by the pulse pattern generator. The pulse pattern generator may further optionally include various optical elements in any of the two or more paths to adjust the amplitudes of any of the constituent pulses in the intermediate patterned burst-mode beam prior to the one or more power amplifiers. Further, for the purposes of the present disclosure, the term power amplifier and the term amplifier may be used interchangeably. In this way, it is to be understood that a power amplifier may include any optical amplifier known in the art suitable for providing optical gain.

In some embodiments, a burst-mode laser system is formed as a chirped-pulse amplifier. For example, the burst-mode laser system may include a pulse stretcher prior to the one or more power amplifiers to reduce a peak intensity of laser pulses in the amplifier and a pulse compressor after the one or more power amplifiers to compress the amplified laser pulses from the amplifier. Further, the pulse stretcher may be located either before or after the pulse pattern generator.

It is further contemplated herein that generating an intermediate patterned burst-mode beam (e.g., with a pulse pattern generator) prior to one or more power amplification stages in accordance with the systems and methods disclosed herein may enable high-power burst-mode beams with a wide range of patterns and may further provide multiple benefits over alternative techniques based on manipulating amplified pulses from the power amplification stages. In particular, the systems and methods disclosed herein may provide a high-power patterned burst-mode beam directly from the amplifier or a final pulse compressor when present without the need for any additional optical elements to further shape or manipulate the burst-mode beam to generate a desired pattern. In this way, the systems and methods disclosed herein may avoid nonlinearities, beam deformations, or beam misalignments associated with pulse-manipulation optics located in the path of high-power amplified laser pulses. For example, damage thresholds or thermal management concerns may limit the achievable peak intensities of output laser pulses when pulse-manipulation optics are placed after an amplifier. By way of another example, pulse-manipulation optics placed after an amplifier may introduce undesirable phase modifications to the amplified laser pulses even if placed before a final pulse compressor. In contrast, the systems and methods disclosed herein provide pulse manipulation prior to amplification at power levels sufficiently low to avoid nonlinear effects coupled with tailored amplification such that the amplified output pulses have well-controlled spatial, temporal, and phase characteristics.

By way of another example, pulse-manipulation optics placed after an amplifier that include a beamsplitter, multiple delay lines, and a beam combiner may introduce different beam pointing directions for laser pulses associated with the different delay lines such that even small alignment errors may severely limit the ability to utilize such a system for long-distance applications. In contrast, the pulse pattern generator and the one or more power amplifiers associated with the systems and methods disclosed herein may provide tight control over the pointing directions of all amplified laser pulses in a burst-mode beam. For instance, various aspects of the one or more power amplifiers such as, but not limited to, the number of amplification stages, the path length through the amplifier, or the gain profiles through the one or more power amplifiers may be selected to compensate for misalignments in the pulse pattern generator within design tolerances and/or preferentially amplify portions of the intermediate patterned burst-mode beam from the pulse pattern generator along a common amplification axis. As a result, the amplified laser pulses within the burst-mode beam may be aligned at long distances (e.g., on the order of kilometers or greater).

It is recognized herein that high-energy laser pulses may generate a plasma on a target surface. These laser-induced plasmas may further produce shockwaves, acoustics, surface heating, thermal gradients, and/or electromagnetic emission across a wide spectral range including radio-frequencies, optical frequencies, and X-rays. By illuminating the target with additional pulses at an inter-pulse spacing shorter than the plasma lifetime, these subsequent pulses may interact with the laser-produced plasma. Accordingly, tailored bursts of ultrashort laser pulses provided by embodiments herein facilitate new paradigms of interaction science through which the properties and duration of the laser-produced plasma may be manipulated to produce phenomena not possible through single-pulse interactions.

Some embodiments of the present disclosure are directed to generating tailored bursts of laser pulses with sufficient peak power to produce filamentation in the atmosphere. In this regard, these new paradigms of interaction science may be extended to targets at long distances.

Some embodiments of the present disclosure are directed to tailoring burst-mode laser pulses to manipulate a target plasma to produce desired on-target effects at either short or long distances. In this way, desired on-target effects may be achieved with or without generating filaments.

In some embodiments, burst-mode laser pulses are generated with tailored inter-pulse spacing selected to generate radio-frequency (RF) emission at selected RF tones on a target. In this way, both narrowband and tailored broadband RF spectra may be generated at the target. In additional embodiments, burst-mode laser pulses are tailored to induce electromagnetic emission within additional spectral ranges such as, but not limited to, tailored X-ray emission or tailored white light (e.g., supercontinuum) emission. When combined with burst-mode filamentation, this emission may be generated on remote targets.

In some embodiments, burst-mode laser pulses are tailored to induce acoustic signals and/or shockwaves on a target, which may be suitable for disrupting or otherwise interfering with remote electronic equipment on or near the target.

In some embodiments, burst-mode laser pulses are tailored to induce highly-controlled material modification on a target and/or manipulation of the thermal and optical properties of the target. For example, the burst-mode laser pulses may be tailored to provide highly efficient ablation through manipulation of the laser-generated plasma on the target to enhance energy deposition by the burst-mode beam.

Referring now to FIGS. 1A through 14, systems and methods for generating tailored bursts of laser pulses are described in greater detail.

Figure 2:
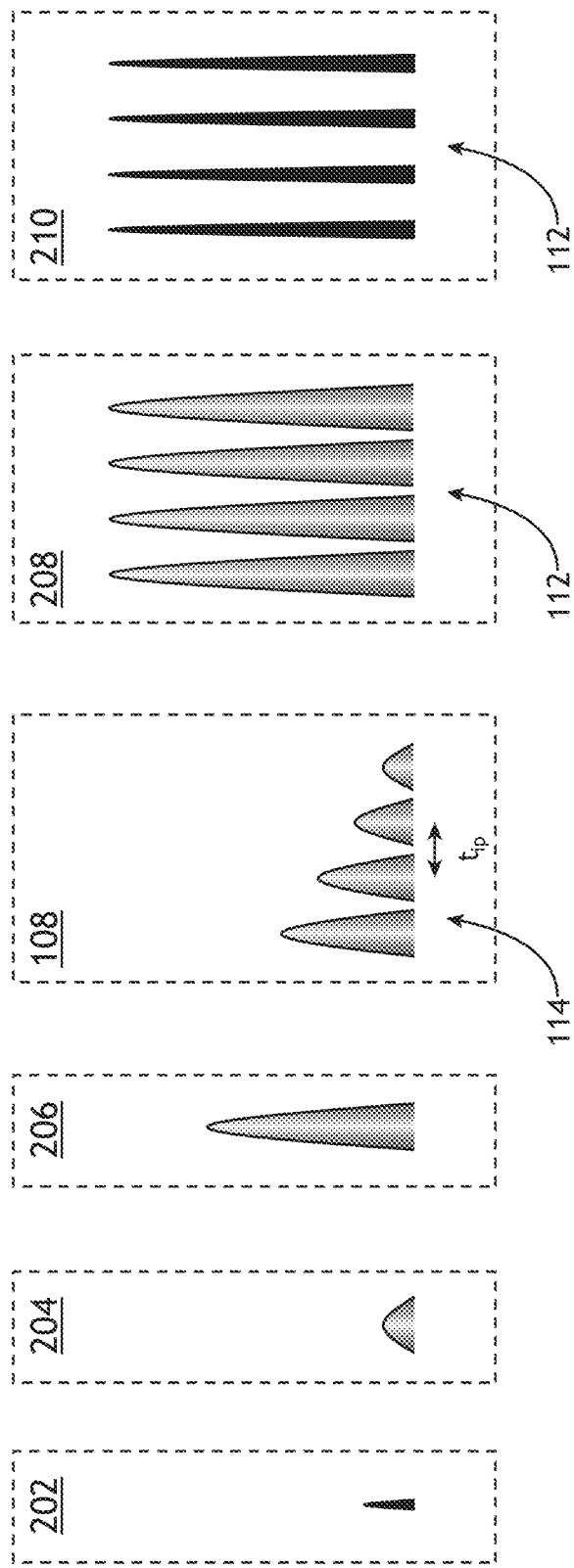
FIG. 2 is a conceptual view of the evolution of laser pulses throughout the burst-mode laser system illustrated in FIG. 1A, in accordance with one or more embodiments of the present disclosure.

FIG. 1A is a block diagram illustrating a burst-mode laser system 100 in accordance with one or more embodiments of the present disclosure. FIG. 2 is a conceptual view of the evolution of laser pulses throughout the burst-mode laser system 100 illustrated in FIG. 1A, in accordance with one or more embodiments of the present disclosure. It is noted that in FIG. 2, the horizontal axis represents time and the vertical axis represents intensity, though FIG. 2 is not drawn to scale and is provided for illustrative purposes only. It is to be understood, however, that FIGS. 1A and 2 are provided solely for illustrative purposes and should not be interpreted as limiting. As described herein, the amplified patterned burst-mode beam 112 is not limited to either the particular components in the figure or the arrangement of such components and that the particular evolution of laser pulses through the system may change accordingly.

In one embodiment, the burst-mode laser system 100 includes a seed laser 102 to generate a pulsed seed beam 104, a pulse pattern generator 106 to generate an intermediate patterned burst-mode beam 108 with laser pulses formed from the seed beam 104 having a selected intermediate burst pattern, and one or more power amplifiers 110 to generate an amplified patterned burst-mode beam 112 having a selected amplified burst pattern through amplification of the intermediate patterned burst-mode beam 108. In the context of the present disclosure, a burst pattern (e.g., an intermediate burst pattern and/or an amplified burst pattern) includes a distribution of two or more laser pulses having selected inter-pulse spacings and/or selected amplitudes. In this regard, the burst-mode laser system 100 may operate as a variant of a Master Oscillator Power Amplifier (MOPA) in which an output burst pattern of the amplified patterned burst-mode beam 112 is controlled, adjusted, or otherwise selected based on simultaneous control over the intermediate burst pattern and amplification characteristics of the one or more power amplifiers 110 such as, but not limited to, a number of amplification stages or passes through gain media, pump power at one or amplification stages, gain profiles at one or more amplification stages, or timings of pump lasers at one or more amplification stages.

As is described throughout the present disclosure, it is contemplated herein that generating an amplified patterned burst-mode beam 112 by first generating an intermediate patterned burst-mode beam 108 with a selected intermediate burst patten and then providing tailored amplification of the various pulses within the intermediate patterned burst-mode beam 108 as disclosed herein may enable the direct generation of highly-configurable amplified burst patterns at a wide range of output powers, pulse energies, or pulse energy densities. For example, the amplified patterned burst-mode beam 112 may include pulses with pulse energies ranging from microjoules to joules and inter-pulse spacings ranging from nanoseconds to attoseconds.

Further, the systems and methods disclosed herein enable the both greater control over amplified burst patterns and higher output powers or pulse energies than existing techniques such as the manipulation of amplified pulses.

For example, manipulation of amplified pulses is typically inefficient and limits the achievable pulse energies based on damage or nonlinearities in pulse-manipulation optics. As an illustration, an amplified pulse train (e.g., an output of a traditional amplified laser) may be manipulated using beamsplitters, beam combiners, or the like. However, such elements shape the relative amplitudes of constituent pulses by reducing the pulse energies, thereby wasting available output power provided by the amplifier. In contrast, the systems and methods disclosed herein generate an intermediate patterned burst-mode beam 108 with selected inter-pulse spacings prior to power amplification. This technique wastes less power since loss is introduced prior to power amplification and further enables greater control over the relative amplitudes of the constituent pulses in the amplified patterned burst-mode beam 112. For instance, operating the one or more power amplifiers 110 in a saturation mode may provide output pulses with uniform amplitudes even if the amplitudes of the intermediate patterned burst-mode beam 108 are non-uniform. In another instance, the gain characteristics of the one or more power amplifiers 110 may be manipulated or otherwise selected to provide different levels of amplification for different pulses or groups of pulses to provide a desired uniform or non-uniform pattern of amplitudes in the amplified patterned burst-mode beam 112.

Additionally, the use of beamsplitters, beam combiners, or the like after the output of a laser amplifier may introduce beam pointing errors between constituent output pulses due to misalignments of these elements, which may severely limit the ability to use such a system for long-distance applications. In contrast, the systems and methods disclosed herein may provide tightly-controlled beam-pointing for all constituent pulses in the amplified patterned burst-mode beam 112 and may in some cases correct for some misalignments in the pulse pattern generator 106. For example, the gain profiles in the one or more power amplifiers 110 may be designed to preferentially amplify light along a common amplification axis within a selected tolerance such that pulses from the pulse pattern generator 106 within this tolerance may at least partially converge within the one or more power amplifiers 110 to form a coaxial amplified beam.

By way of another example, any optical elements placed in the path of an amplified beam may modify the spatial, temporal, or phase characteristics of the beam, particularly at high powers, through various mechanisms including nonlinear dispersion, thermal effects, or the like. In this way, the properties of laser pulses on a target at close or remote distances may be negatively impacted. Further, at sufficiently high powers, amplified pulses may introduce physical damage in optical elements such as, but not limited to, ablation, the formation of color centers, or the like. In contrast, the systems and methods disclosed herein provide an amplified patterned burst-mode beam 112 with desired amplified burst pattern as a direct output.

In a general sense, the systems and methods disclosed herein may thus enable the formation of an arbitrary amplified patterned burst-mode beam 112 based on the simultaneous control of the pulse pattern generator 106 and the one or more power amplifiers 110. Further, a gain profile through the one or more power amplifiers 110 may reduce a variation of at least one beam parameter for laser pulses in the amplified patterned burst-mode beam 112 associated with different delay paths in the pulse pattern generator 106, where the one or more beam parameters may include, but are not limited to, a pointing direction, a spot size, or a divergence.

The seed laser 102 may include any type of pulsed laser system known in the art for providing at least one seed pulse 202. Further, the seed laser 102 may generate single-shot pulses or a pulse train having a fixed or variable repetition rate. In some embodiments, the seed laser 102 includes a laser oscillator. For example, a fiber-based oscillator may provide turn-key operation with excellent stability. Further, fiber-based oscillators capable of providing up to GHz repetition rates are under development. By way of another example, the seed laser 102 may include a solid-state modelocked oscillator, which may provide, but is not limited to, repetition rates in the range of 10 MHz to GHz. In some embodiments, the seed laser 102 includes a directly-driven pulsed diode. In some embodiments, the seed laser 102 includes a pulse-pumped laser system, which operates by inverting the gain of a cavity just long enough to send out a single pulse. These systems may further be configured to provide a train of pulses with repetition rates typically in the range of kHz.

In some embodiments, the burst-mode laser system 100 includes multiple seed lasers 102. For example, the burst-mode laser system 100 may include seed lasers 102 having different pulse characteristics such as, but not limited to, pulse durations, or wavelengths. In this regard, multiple seed lasers 102 may enable the formation of tailored bursts of laser pulses having any desired characteristics.

In another embodiment, the pulse pattern generator 106 generates an intermediate patterned burst-mode beam 108 with a tailored pattern of inter-pulse spacings, $t_{ip}$, between constituent pulses. Further, the pulse pattern generator 106 may further provide a tailored pattern of the amplitudes (e.g., pulse energies, pulse energy densities, peak intensities, or the like) for any of the constituent pulses. In a general sense, the intermediate patterned burst-mode beam 108 may include any selected intermediate burst pattern including any selected pattern of inter-pulse spacings and/or amplitudes. For example, the intermediate burst pattern may include two or more pulse trains, where pulses in the different pulse trains may have different patterns of amplitudes and where the different pulse trains may be temporally offset from each other by selected offsets. By way of another example, the intermediate burst pattern may include at least one intermediate pulse burst 114 including a selected number of pulses with tailored inter-pulse spacings and/or tailored amplitudes. By way of another example, the intermediate burst pattern may include two or more intermediate pulse bursts 114, where each intermediate pulse burst 114 may be, but is not required to be, separately controlled (e.g., may have different intermediate burst patterns). As an illustration, FIG. 2 illustrates an intermediate pulse burst 114 forming at least a portion of the intermediate patterned burst-mode beam 108.

The pulse pattern generator 106 may include any combination of elements for manipulating one or more pulses from the seed laser 102 into an intermediate patterned burst-mode beam 108 having any selected intermediate burst pattern such as, but not limited to, beamsplitters, beam combiners, phase plates, or adaptive optical elements. It is contemplated herein that the configuration of the pulse pattern generator 106 may vary based on the seed laser 102 and the desired properties of the amplified patterned burst-mode beam 112.

Figure 1B:
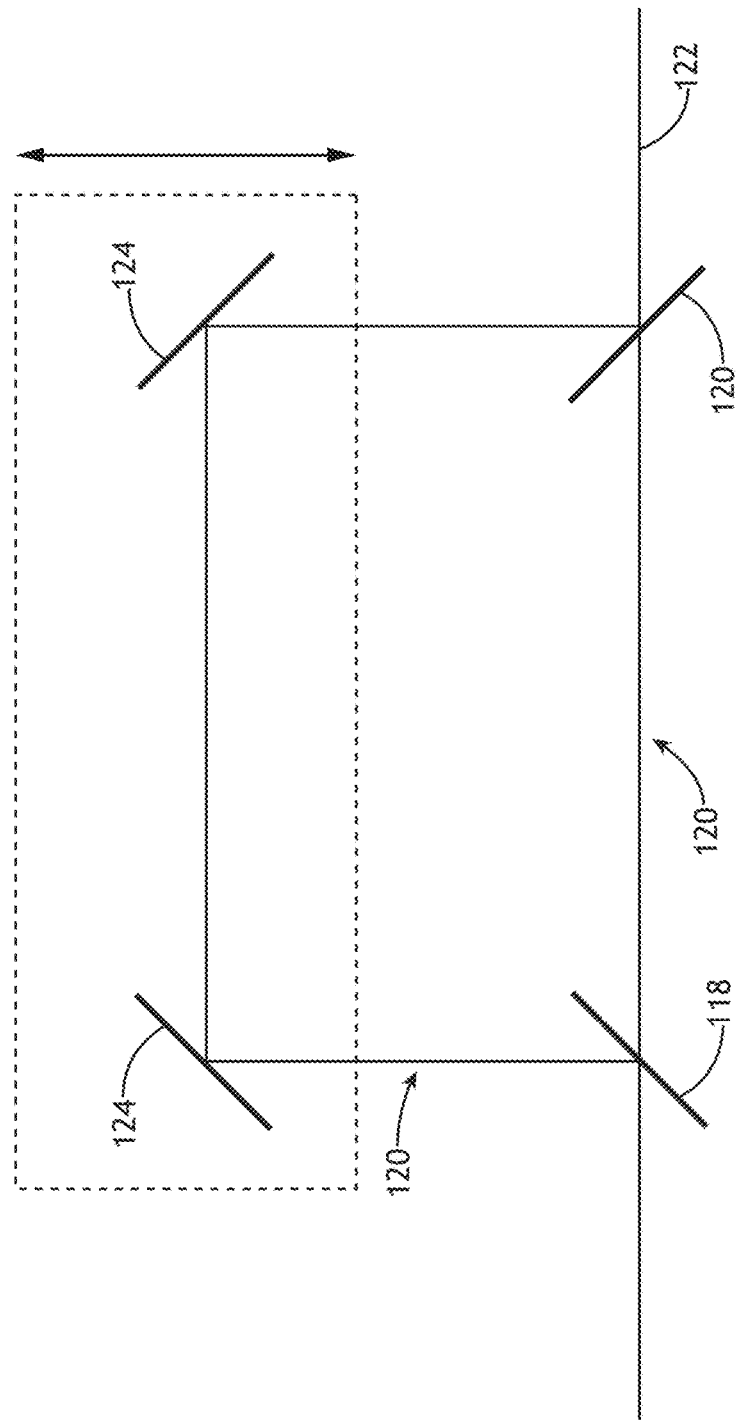
FIG. 1B is a conceptual view of a pulse multiplier in accordance with one or more embodiments of the present disclosure.

In one embodiment, the pulse pattern generator 106 includes one or more pulse multipliers. FIG. 1B is a conceptual view of a pulse multiplier 116 in accordance with one or more embodiments of the present disclosure. A pulse multiplier 116 may include at least one beamsplitter 118 to split an input pulse into two or more delay paths 120 and recombine the various pulses along a coaxial beam path 122. Further, a beamsplitter 118 may be formed as any type of beamsplitter or beam combiner known in the art including, but not limited to, a polarizing or a non-polarizing beamsplitter. In this way, a beamsplitter 118 may be used to split an incident beam to two delay paths 120 and/or combine light from multiple delay paths 120 to the coaxial beam path 122. The pulse multiplier 116 may further include various mirrors 124 or other optical elements suitable for manipulating the light in the delay paths 120. In this regard, the entire intermediate patterned burst-mode beam 108 or an intermediate pulse burst 114 in the intermediate patterned burst-mode beam 108 may include multiple pulse trains that may be temporally offset based on the optical path lengths of each delay path 120. In another embodiment, an optical path length of at least one of the delay paths 120 is adjustable. In this way, the pattern of inter-pulse spacings in the intermediate patterned burst-mode beam 108 or an intermediate pulse burst 114 may be modified or otherwise adjusted. The optical path length of a delay path 120 may be adjusted using any technique known in the art such as, but not limited to, mounting one or more optical elements on an adjustable translation stage or selectively coupling light into one of multiple available fixed-length optical paths. For example, FIG. 1B illustrates a configuration in which the mirrors 124 are adjustable.

It is recognized herein that a pulse multiplier 116 may be similar to an interferometer except that the lengths of the delay paths 120 are set such that pulses in the various delay paths 120 do not temporally overlap on the coaxial beam path 122. It is further recognized herein that the systems and methods disclosed herein may differ from divided pulse amplification or other similar techniques. For example, in divided pulse amplification, a seed pulse is transformed into multiple trains, amplified and then recombined such that the divided pulse trains temporally overlap. In contrast, the systems and methods disclosed herein utilize divided pulse trains that are not temporally overlapped when recombined. Further, unlike divided pulse amplification, the polarization states of the various pulse trains may be configured to have different polarizations.

In some embodiments, the pulse pattern generator 106 generates the intermediate patterned burst-mode beam 108 by manipulating a train of pulses from the seed laser 102 (e.g., a train of seed pulses 202). For example, the pulse pattern generator 106 may include an envelope shaper to selectively pass bursts of seed pulses 202 to form the intermediate patterned burst-mode beam 108. In this way, the pulse pattern generator 106 may select the number of laser pulses in each intermediate pulse burst 114 as well as the spacing between the intermediate pulse bursts 114. The envelope shaper may further adjust the intensities of the laser pulses in each intermediate pulse burst 114. The envelope shaper may include any combination of optical elements known in the art suitable for defining an envelope of the burst-mode beam such as, but not limited to, a pulse-picker, a pulse carver, a pulse shaper, or the like. Further, the pulse pattern generator 106 may operate in the temporal or spectral regime.

The pulse pattern generator 106 may also include one or more components to control the inter-pulse spacings within each intermediate pulse burst 114 or within the intermediate patterned burst-mode beam 108 generally.

In some embodiments, the pulse pattern generator 106 includes a pulse multiplier 116 configured to increase the repetition rate (or decrease the inter-pulse spacing) of the laser pulses in each intermediate pulse burst 114 to a multiple of the repetition rate of the seed laser 102. Accordingly, the repetition rate of the full burst-mode laser system 100 is not limited by the repetition rate of the seed laser 102.

It is to be understood that the pulse pattern generator 106 may include any number of pulse multipliers 116 in any suitable design to provide an intermediate patterned burst-mode beam 108 with any selected or arbitrary intermediate burst pattern. For example, pulse multipliers 116 may be cascaded within the pulse pattern generator 106 such that an intermediate pulse burst 114 may include multiple pulse trains with different repetition rates. By way of another example, any delay path 120 in a pulse multiplier 116 may include a separate envelope shaper to further modify the properties of the intermediate patterned burst-mode beam 108. Accordingly, an intermediate pulse burst 114 may be engineered to provide any selected distribution of inter-pulse spacings based on manipulation of the train of seed pulses 202. Further, in some embodiments, the pulse pattern generator 106 may include one or more adjustable beam stops to selectively direct light through any combination of delay paths to provide dynamically-adjustable intermediate burst patterns.

Figure 1C:
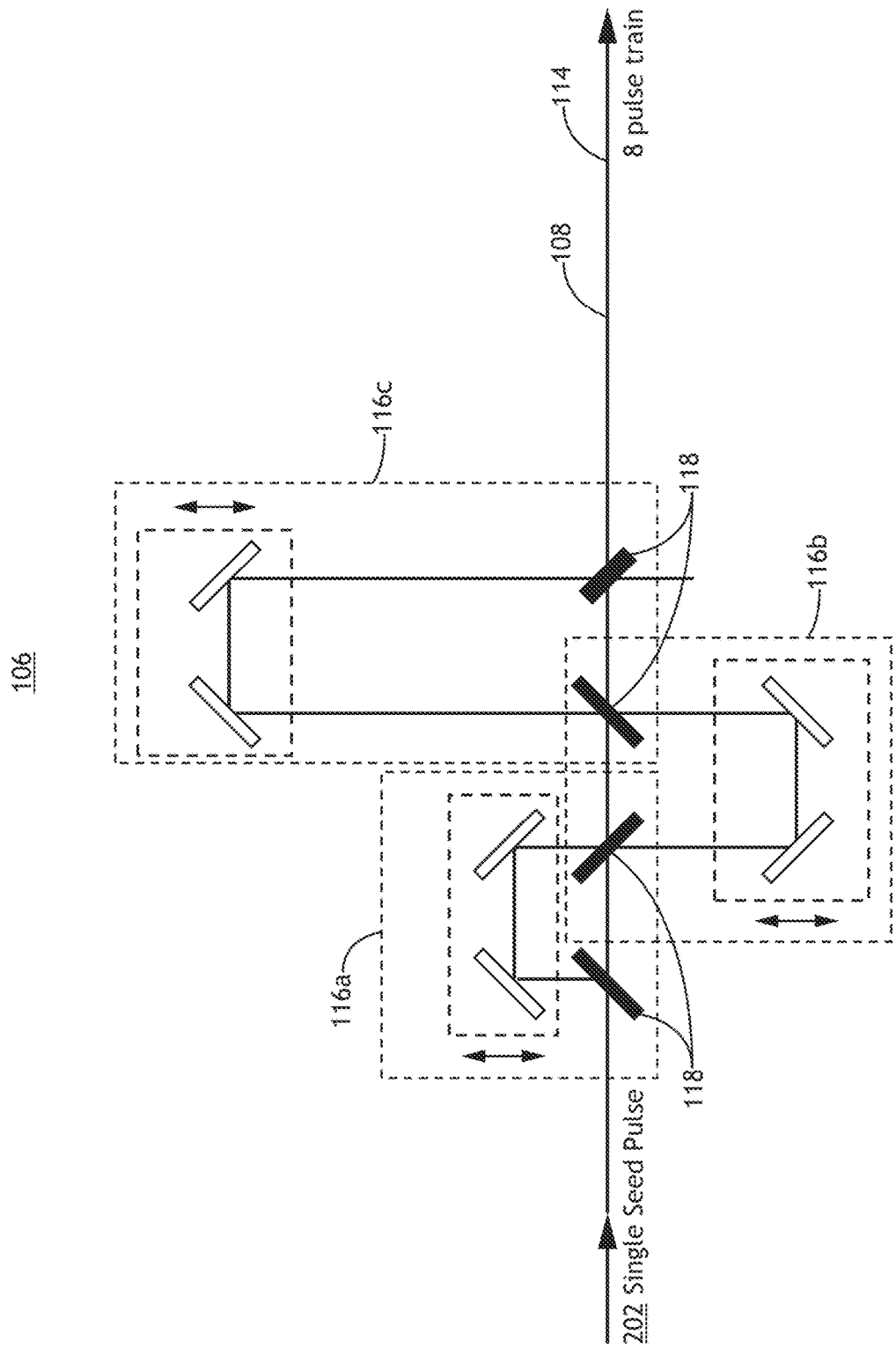
FIG. 1C is a conceptual view of a pulse pattern generator designed to generate an intermediate pulse burst including eight pulses from a single seed pulse, in accordance with one or more embodiments of the present disclosure.

FIG. 1C is a conceptual view of a pulse pattern generator 106 designed to generate an intermediate pulse burst 114 including eight pulses from a single seed pulse 202, in accordance with one or more embodiments of the present disclosure. In particular, FIG. 1C illustrates a first pulse multiplier 116a, a second pulse multiplier 116b, and a third pulse multiplier 116c, where some of the beamsplitters 118 are shared between the various pulse multipliers 116 to both split and combine light, where each beamsplitter 118 may provide, but is not required to provide, 50% transmission and reflection. It is thus to be understood that the description of single or combinations of pulse multipliers 116 herein is solely for illustrative purposes and that the pulse pattern generator 106 may generally include any combination of mirrors, delay lines, translation stages, beamsplitters, beam combiners, or the like to generate an intermediate patterned burst-mode beam 108 having a desired intermediate burst pattern.

Additional optical elements may be placed within any delay path 120 of a pulse multiplier 116 to manipulate various aspects of the pulses within the delay path 120 such as, but not limited to, the intensity, phase, polarization, or wavelength of the pulses.

In some embodiments, the pulse pattern generator 106 generates an intermediate pulse burst 114 by manipulating a single seed pulse 202 from the seed laser 102, which may be a single-shot output from the seed laser 102 or a picked pulse from a seed laser 102 operating with a given repetition rate. For example, the pulse pattern generator 106 may include a series of pulse multipliers 116 to build the intermediate patterned burst-mode beam 108 from the single seed pulse 202.

By way of another example, the pulse pattern generator 106 may include one or more optical cavities that may or may not achieve gain. For example, an optical cavity may provide a pulse train with a repetition rate defined by the round-trip time of pulses in the optical cavity. Further, multiple pulses may be trapped within a cavity to generate unique sets of pulse spacings. An optical cavity may also optionally include a gain medium, which may be pumped by any means (e.g., optical, electrical, or the like) to provide amplification of light in the cavity. In some embodiments, the pulse pattern generator 106 may include at least one pulse multiplier 116 and at least one cavity in a hybrid approach to provide a selected distribution of pulses in an intermediate pulse burst 114. Accordingly, each intermediate pulse burst 114 may be engineered to provide any selected distribution of inter-pulse spacings based on the single-pulse input.

Referring again to FIGS. 1A and 2, the burst-mode laser system 100 may include one or more power amplifiers 110 to amplify the intermediate patterned burst-mode beam 108 and generate the amplified patterned burst-mode beam 112.

The one or more power amplifiers 110 may include any number of amplifiers or amplification stages to provide desired power levels at any location within the burst-mode laser system 100. The power amplifiers 110 may further include any type of amplifiers known in the art including, but not limited to solid-state amplifiers, fiber amplifiers, or gas discharge amplifiers. Further, the power amplifiers 110 may utilize any type of pumping technique known in the art including, but not limited to diode-pumping or flash-lamp pumping.

In some embodiments, the burst-mode laser system 100 includes a pre-amplifier 126 to amplify pulses from the seed laser 102 prior to entering the pulse pattern generator 106 and one or more power amplifiers 110 to amplify the intermediate patterned burst-mode beam 108 from the pulse pattern generator 106. For example, a seed pulse 202 from the seed laser 102 may be temporally stretched by the pulse stretcher 128 to create a stretched pulse 204, which lowers the peak intensity and introduces spectral chirp (shown as the stretched pulse 204 with a gradient in FIG. 2). The seed pulse 202 may then be amplified by the pre-amplifier 126 to be an amplified seed pulse 206. In this way, the performance of each component of the burst-mode laser system 100 may be tailored. For instance, a pre-amplifier 126 may be used to increase the pulse energies of pulses in the intermediate patterned burst-mode beam 108 to desired levels to reduce or otherwise control the gain requirements of the one or more power amplifiers 110, but maintain pulse energies below thresholds for undesirable damage or nonlinear effects by components of the pulse pattern generator 106.

In some embodiments, the burst-mode laser system 100 includes a pulse stretcher 128 to increase the temporal duration of the laser pulses through the addition of spectral chirp and a pulse compressor 130 to compress the pulses by removing the spectral chirp. In this regard, the burst-mode laser system 100 may operate as a chirped-pulse amplification system. Any number of pulse stretchers 128 or pulse compressors 130 may be located throughout the burst-mode laser system 100 to reduce nonlinearities at any stage. The amplified patterned burst-mode beam 112 may also be tailored to have any desired amount of positive or negative spectral chirp. For example, it may be advantageous in some long-range applications to provide negatively-chirped amplified patterned burst-mode beam 112 such that the constituent pulses may be temporally compressed after propagating a desired distance. It is further contemplated herein that coupling a pulse stretcher 128 and pulse compressor 130 with the placement of a pulse pattern generator 106 prior to the one or more power amplifiers 110 as disclosed herein may enable higher output energies than an alternative single-shot amplified system with pulse-manipulation optics after the output since the energy in an amplified pulse burst 210 is temporally distributed across the constituent pulses such that each constituent pulse may have a pulse energy (or energy density) below a damage threshold of the pulse compressor 130.

For example, FIG. 2 illustrates an uncompressed amplified pulse burst 208 from the one or more power amplifiers 110 associated with an amplified version of the intermediate patterned burst-mode beam 108 and a compressed amplified pulse burst 210 from the pulse compressor 130, which may form all or part of the amplified patterned burst-mode beam 112.

It is to be understood, however, that the description of a pre-amplifier 126, the pulse stretcher 128, and the pulse compressor 130 in FIGS. 1 and 2 are optional and are provided solely for illustrative purposes. In some embodiments, the pulse pattern generator 106 operates directly on the seed pulse 202. In some embodiments, the seed laser 102 includes an amplifier to generate seed pulses 202 with a desired power level.

In some embodiments, the amplified patterned burst-mode beam 112 includes multiple high-energy output amplified pulse bursts 210, followed by (or following) a temporal gap before any additional output amplified pulse bursts 210. Such a technique may be referred to as burst of burst (BB). For example, a burst of output amplified pulse bursts 210 may be generated by selecting pulses from the seed laser 102 to create a selected number of output amplified pulse bursts 210 within a burst window, and blocking further pulses from the seed laser 102 within a selected delay window to allow the power amplifiers 110 to recover. For instance, the burst window may be, but is not required to be, less than 1 ms and the delay window may be, but is not required to be, longer than 1 ms.

Referring now generally to FIG. 1A, it is contemplated herein that the pattern of amplitudes of constituent pulses in the amplified patterned burst-mode beam 112 generally or in any amplified pulse burst 210 may be controlled through the pulse pattern generator 106, the power amplifiers 110, or a combination thereof. For example, operating the one or more power amplifiers 110 in a non-saturation mode may preserve the pattern of amplitudes of the intermediate patterned burst-mode beam 108 (e.g., the relative amplitudes of the constituent pulses) during amplification. By way of another example, operating the one or more power amplifiers 110 in a saturation mode may provide uniform amplitudes regardless of the amplitude pattern in the intermediate patterned burst-mode beam 108. It is further contemplated herein that generating an amplified pulse burst 210 with a relatively large number of constituent pulses may require precise control of pumping characteristics (e.g., pump power, pump timing, or the like) of the power amplifiers 110 to mitigate or otherwise control gain saturation to provide a desired amplitude pattern for the constituent pulses.

In some embodiments, elements for introducing optical loss may be placed within selected paths in pulse pattern generator 106. For example, one or more neutral-density filters may be placed in selected delay paths of one or more pulse multipliers. By way of another example, the pulse pattern generator 106 may include beamsplitters or beamcombiners with split ratios not equal to 50%. In some embodiments, the pulse pattern generator 106 includes one or more temporal pulse shapers such as, but not limited to, acousto-optical or electro-optical modulators to deflect energy from the pulse train to carve out the pulse shape for amplification.

Figure 3A:
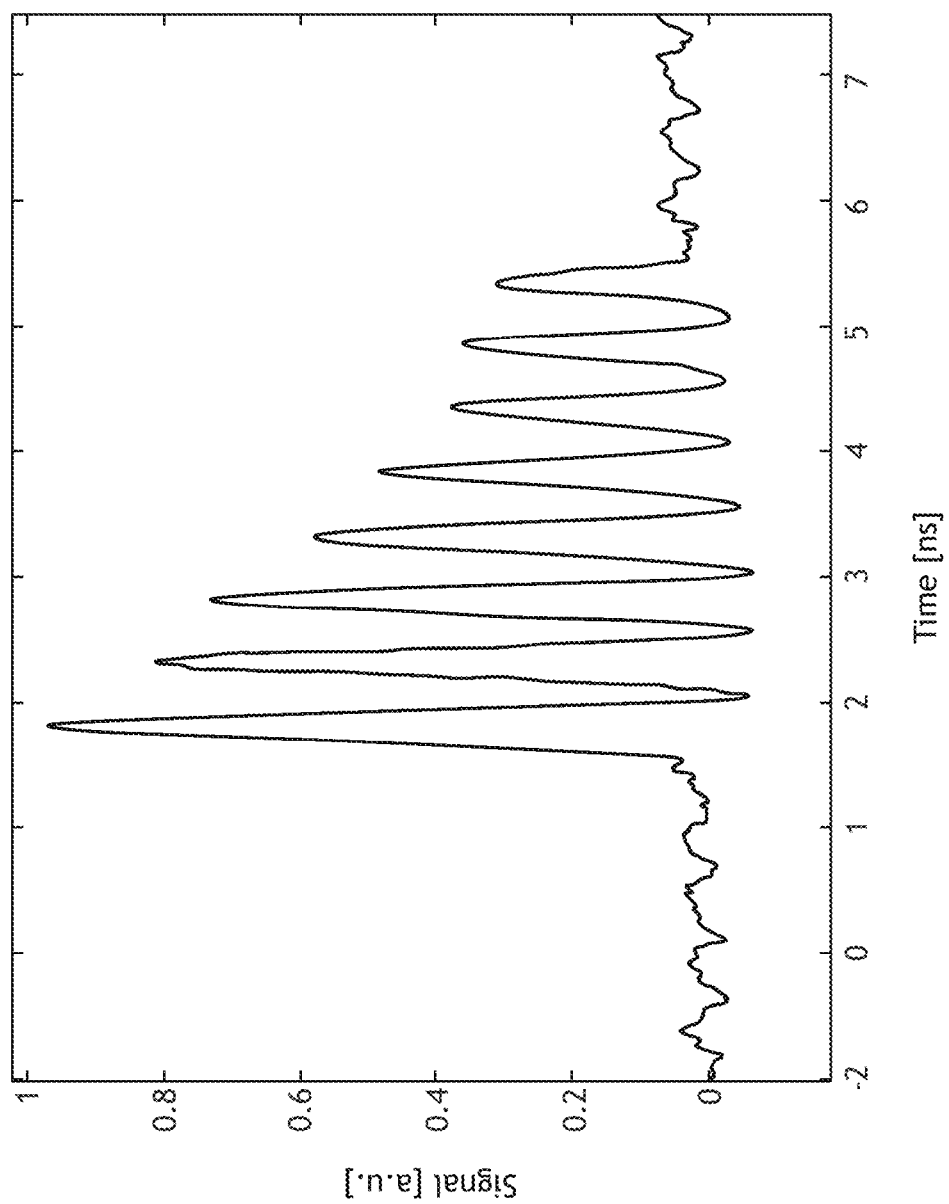
FIG. 3A is a plot illustrating a typical intensity profile of an amplified pulse burst exhibiting saturation generated without controlling the intensity of pulses in an intermediate pulse burst from the pulse pattern generator, in accordance with one or more embodiments of the present disclosure.

In some embodiments, the burst-mode laser system 100 (e.g., in the pulse pattern generator 106) includes one or more pulse shapers to control the intensity of pulses in the intermediate patterned burst-mode beam 108. For example, it may be desirable to avoid saturation of the first few pulses to ensure that all pulses are equally amplified by the power amplifiers 110. FIG. 3A is a plot illustrating a typical intensity profile of an amplified pulse burst 210 exhibiting saturation generated without controlling the intensity of pulses in an intermediate pulse burst 114 from the pulse pattern generator 106, in accordance with one or more embodiments of the present disclosure.

In some embodiments, pulse shaping is performed during amplification (e.g., within one or more power amplifiers 110). For example, multi-stage pumping may be used to dynamically control the gain of the amplifiers by delaying the firing of pumps for amplification after a portion of the train enters a power amplifier 110. By way of another example, the burst-mode laser system 100 may include a saturable absorber to preferentially absorb the front end of the intermediate pulse burst 114 (or amplified pulse burst 210 depending on the location of the saturable absorber) while allowing the back end through with less loss.

It is further contemplated herein that the one or more power amplifiers 110 may operate on the entirety of the intermediate patterned burst-mode beam 108, a particular intermediate pulse burst 114, a particular group of pulses, on a single pulse, or on a combination thereof. For example, the one or more power amplifiers 110 may include at least one power amplifier 110 to operate on the entire intermediate patterned burst-mode beam 108 or an intermediate pulse burst 114 thereof. By way of another example, the one or more power amplifiers 110 may include dedicated power amplifiers 110 for different portions of the intermediate patterned burst-mode beam 108 or an intermediate pulse burst 114 thereof. For instance, the intermediate patterned burst-mode beam 108 may propagate through all power amplifiers 110 in the burst-mode laser system 100, but the timing of associated pump lasers may be adjusted to provide temporally-controlled gain. In this way, the gain characteristics for individual intermediate pulse bursts 114, groups of laser pulses, or single laser pulses may be individually controlled to provide a desired amplified burst pattern.

Figure 3B:
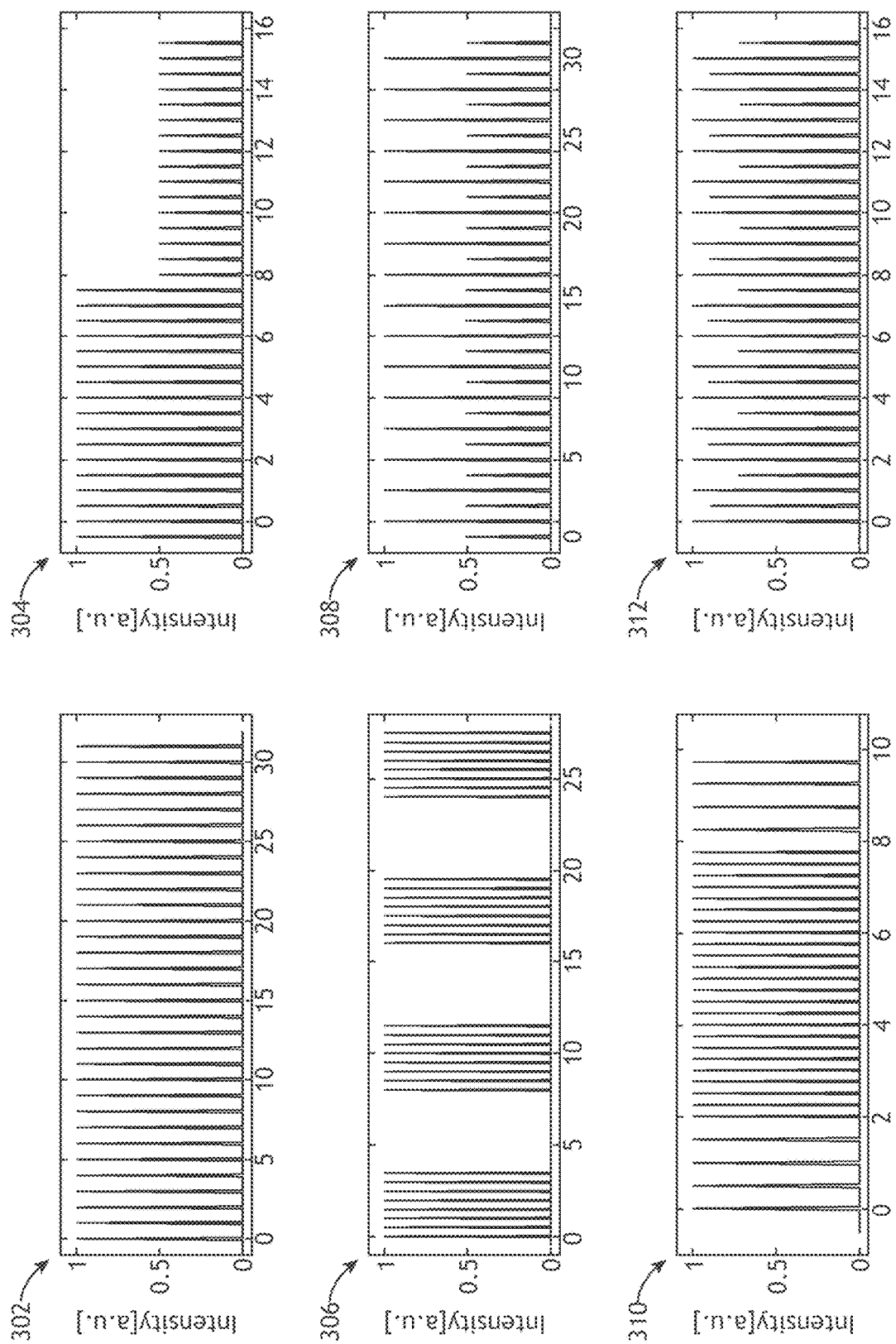
FIG. 3B includes a series of plots illustrating various non-limiting output amplified pulse bursts that may form all or part of the amplified patterned burst-mode beam in accordance with one or more embodiments of the present disclosure.

FIG. 3B includes a series of plots illustrating various non-limiting output amplified pulse bursts 210 that may form all or part of the amplified patterned burst-mode beam 112 in accordance with one or more embodiments of the present disclosure. Plot 302 illustrates uniform pulses with equal inter-pulse spacing between all pulses. Plot 304 illustrates an amplified pulse burst 210 with equal inter-pulse spacing between all pulses, but where pulses in a first half of the burst have a first amplitude and pulses in a second half of the burst have a second amplitude. Plot 306 illustrates an amplified pulse burst 210 with multiple (e.g., four) sub-bursts, where pulses in each of the sub-bursts have a common amplitude. Plot 308 illustrates an amplified pulse burst 210 with equal inter-pulse spacing between all pulses and alternating amplitudes. Plot 310 illustrates an amplified pulse burst 210 with equal amplitudes for all pulses, but with varying inter-pulse spacing. In particular, a first portion of the amplified pulse burst 210 is characterized by a first inter-pulse spacing, a second portion of the amplified pulse burst 210 is characterized by a second inter-pulse spacing, and a third portion of the amplified pulse burst 210 is characterized by the first inter-pulse spacing. Plot 312 illustrates an amplified pulse burst 210 with equal inter-pulse spacings between all pulses, but with a periodic progression of amplitudes.

In FIG. 3B, each of the plots illustrate an amplified pulse burst 210 with 32 pulses, though it is to be understood that the systems and methods disclosed herein are suitable for generating output amplified pulse bursts 210 with any arbitrary number of pulses. For example, an amplified pulse burst 210 may include 500, 1000, or greater numbers of pulses. It is contemplated herein that arbitrarily large numbers of pulses in an amplified pulse burst 210 may be provided through the use of multiple power amplifiers 110 with controlled gain characteristics as described herein. For example, arbitrarily large numbers of pulses in an amplified pulse burst 210 may be, but are not required to be, provided by the use of multiple dedicated power amplifiers 110 for different groups of pulses. Further, the systems and methods disclosed herein are suitable for generating output amplified pulse bursts 210 with any periodic or non-periodic pattern of inter-pulse spacings and/or amplitudes.

In some embodiments, the pulses within the amplified patterned burst-mode beam 112 have sufficient peak energy to induce filamentation. The generation of plasmas on solid surfaces require high laser intensities (>$10^{10}$ W/cm$^2$), which typically require focused laser beams. Since a focused spot size typically increases with the focal length of the focusing lens, laser beams focused onto remote surfaces at increasingly large distances very quickly possess intensities too weak to generate plasma.

Laser filaments are a special case of laser propagation through the atmosphere, where two competing processes serve to focus down and guide the laser energy such that the beam does not diverge. The lack of divergence provides the ability to project intense amounts of energy in a very confined spot (~100 um) located kilometers from the laser source. In particular, ultrafast laser pulses having peak powers above a certain critical value (e.g., $$3.72 \frac{\lambda_0^2}{8\pi n_0 n_2} \sim 3.2 \, GW$$

at 800 nm in air) may form laser filaments.

In some embodiments, the inter-pulse spacing of laser pulses within the amplified patterned burst-mode beam 112 is selected to provide temporal stitching of filaments. During filamentation, the competing processes of Kerr self-focusing and defocusing by the plasma generated on axis may clamp the intensity and peak plasma density of the filament. Thus, the plasma, which peaks at ~$1 \times 10^{16}$ cm$^{-3}$, only lasts ~1 ns, limiting many applications. A burst of filamenting pulses with the correct temporal spacing can re-energize the plasma created by the previous pulse, ultimately producing a continuous plasma lasting as long as the burst.

Figure 4A:
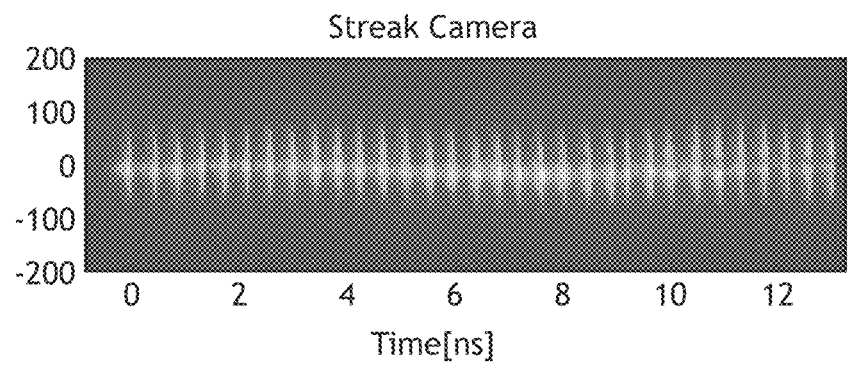
FIG. 4A is an image of the filament burst on a streak camera to verify the pulses were spatially overlapped in accordance with one or more embodiments of the present disclosure.
Figure 4B:
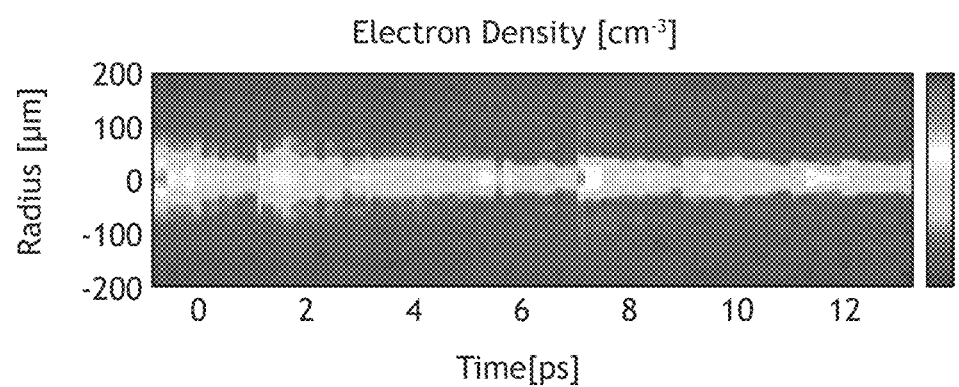
FIG. 4B is a plot of an interferometric measurement of the plasma density of the burst in accordance with one or more embodiments of the present disclosure.
Figure 4C:
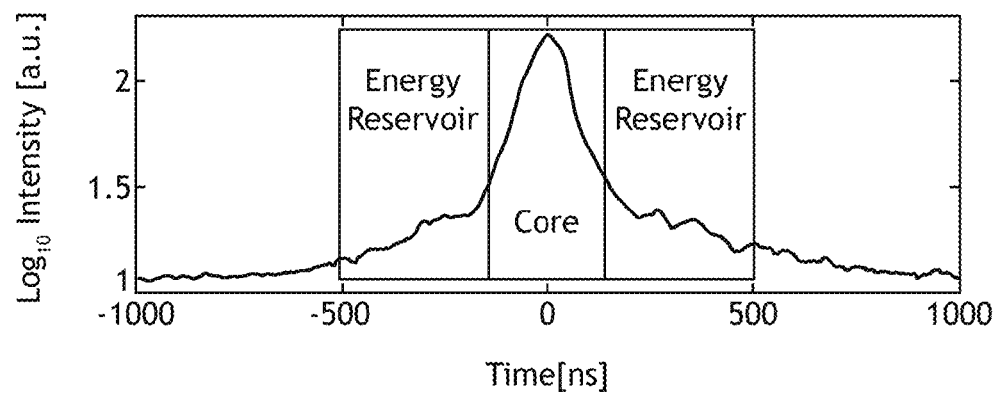
FIG. 4C is a diagram illustrating the beam profile of the pulses in the burst in accordance with one or more embodiments of the present disclosure.
Figure 4D:
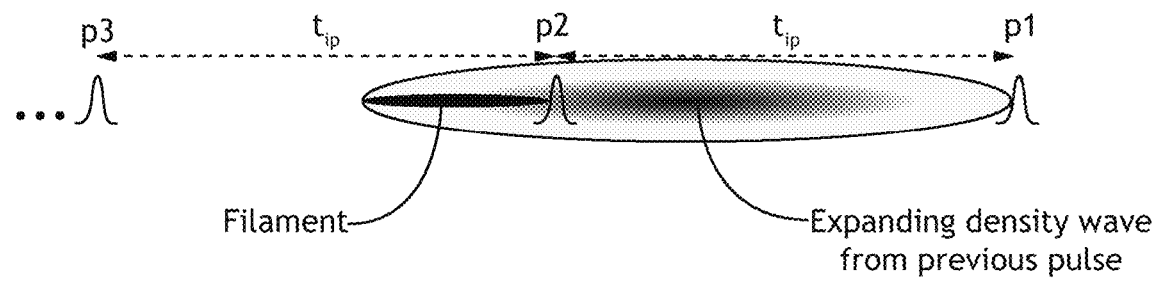
FIG. 4D is an illustration of the impact of inter-pulse spacing on temporal stitching in accordance with one or more embodiments of the present disclosure.

Burst-mode filaments are described in D. Reyes, et al., "Temporal stitching in burst-mode filamentation," *JOSA B*, 36(10), pp. G52-G56 (2019), which is incorporated herein by reference in its entirety. FIGS. 4A through 4D illustrate an experimental demonstration of temporal pulse stitching with 32 pulses spaced by 415 ps and 16 pulses spaced by 830 ps, each with ~4 mJ per pulse, in accordance with one or more embodiments of the present disclosure. FIG. 4A is an image of the filament burst on a streak camera to verify the pulses were spatially overlapped in accordance with one or more embodiments of the present disclosure. FIG. 4B is a plot of an interferometric measurement of the plasma density of the burst in accordance with one or more embodiments of the present disclosure. FIG. 4C is a diagram illustrating the beam profile of the pulses in the burst in accordance with one or more embodiments of the present disclosure. FIG. 4D is an illustration of the impact of inter-pulse spacing on temporal stitching in accordance with one or more embodiments of the present disclosure.

In some embodiments, the burst-mode laser system 100 includes one or more beam-distribution elements such as, but not limited to, phase plates, phase masks, or diffractive optics to manipulate the amplified patterned burst-mode beam 112 into a spatially-structured series of patterned burst-mode filament beams, or a spatio-temporal filament structure. For example, spatio-temporal filament structure may include any spatial distribution of patterned filaments such as, but not limited to, circular patterns, rectilinear arrays, or helical structures.

It is contemplated herein that the amount of energy that couples into an individual filament is fundamentally limited. Without any further manipulation, beams containing high powers that are many times the critical threshold break up into random distributions of filaments. Manipulating these beams to produce structured spatial arrays of filaments has well-known advantages for many applications. These structures may serve, for example, as transient free-space waveguides for microwaves. Spatially-structured filaments are generally described in the following publications, each of which is incorporated herein by reference in its entirety: Z. Kudyshev, M. Richardson, and N. Litchinitser, "Virtual hyperbolic metamaterials for manipulating radar signals in air," Nat. Commun. 4, 2557 (2013); Y. Ren, M. Alshershby, Z. Hao, Z. Zhao, and J. Lin, "Microwave guiding along double femtosecond filaments in air," Phys. Rev. E 88, 013104 (2013); N. Barbieri, Z. Hosseinimakarem, K. Lim, M. Durand, M. Baudelet, E. Johnson, and M. Richardson, "Helical filaments," Appl. Phys. Lett. 104, 5 (2014); N. Jhajj, E. Rosenthal, R. Birnbaum, J. Wahlstrand, and H. Milchberg, "Demonstration of long-lived high-power optical waveguides in air," Phys. Rev. X 4, 011027 (2014); P. Rohwetter, M. Queisser, K. Stelmaszczyk, M. Fechner, and L. Woste, "Laser multiple filamentation control in air using a smooth phase mask," Phys. Rev. A 77, 5 (2008); H. Gao, W. Chu, G. L. Yu, B. Zeng, J. Y. Zhao, Z. Wang, W. W. Liu, Y. Cheng, and Z. Z. Xu, "Femtosecond laser filament array generated with step phase plate in air," Opt. Express 21, 4612-4622 (2013); and D. Reyes, J. Pena, W. Walasik, N. Litchinitser, S. R. Fairchild, and M. Richardson, "Filament conductivity enhancement through nonlinear beam interaction," Opt. Express 28, 26764-26773 (2020).

Implementing spatial filament arrays in burst-mode operation (e.g., using amplified patterned burst-mode beam 112 as disclosed herein) would enable precise control over filament properties and effects at distance. These spatio-temporal structures would enable effective and efficient use of the energy in a single laser shot. Further, manipulating the formation of filaments in both space and time enables efficient coupling of the laser into filaments suitable for long-distance applications and may additionally allow for greater energy to be controllably delivered to a target at distance. The combination of both spatial and temporal manipulation of burst-mode filaments may thus provide various advantages for previously mentioned burst-mode effects, as well as potentially enabling new effects in areas such as, but not limited to, material modification, delamination, or ablation.

It is further contemplated herein that the systems and methods disclosed herein enable the efficient generation of spatio-temporal filament arrays that are either impractical or not achievable with existing systems such as those based on temporal manipulation of amplified pulses. For example, a 2×2 spatial array of patterned spatio-temporal filaments may be generated by configuring the burst-mode laser system 100 to provide an amplified patterned burst-mode beam 112 with sufficient power to sustain four filaments (e.g., four times the critical power for filament formation) and directly providing this amplified patterned burst-mode beam 112 to the beam-distribution elements. However, a technique utilizing pulse-manipulation optics (e.g., beamsplitters, beam combiners, or the like) to manipulate an amplified laser beam would require pulses with this same power (e.g., four times the critical power for filament formation) to propagate through the associated pulse-manipulation optics. With this arrangement, it would be difficult or impossible to ensure that the pulses were collinear or would not exceed the damage thresholds of the pulse-manipulation optics. This problem is additionally compounded when considering additional numbers of spatially-distributed filaments. However, the systems and methods disclosed herein may provide for the direct generation of an amplified patterned burst-mode beam 112 having high pulse energies (e.g., on the order of Joules) suitable for the formation of massive spatial arrays with any selected distribution. For example, the systems and methods disclosed herein may enable spatio-temporal arrays with tens or hundreds of filaments from an amplified patterned burst-mode beam 112.

Referring now to FIGS. 5A through 13B, tailoring the amplified patterned burst-mode beam 112 to achieve desired effects on a target is described in greater detail herein. Each of the applications below may be implemented on targets at any distance and may further be implemented with or without generating filaments during propagation to the target. Further, the applications described below may be implemented by the burst-mode laser system 100, but are not limited to burst-mode laser system 100. Rather, the applications below may be implemented using tailored pulse bursts generated using any technique known in the art.

In some embodiments, an amplified patterned burst-mode beam 112 is designed to generate tailored RF emission on a target. RF technology is ubiquitous in today's society, with everything from radar to wireless communications relying on it. In general, RF sources can be classified into two major categories, time duration and spectral width where a combination of these is required for each application. For example, Wi-Fi uses a continuous signal to provide constant data within a narrowband spectrum to allow for multiple data channels. As an alternate example, electrical discharges generate short pulses of RF that cover wide sections of spectrum. Given the nature of the RF sources and their use, it is common to have disruptions due to overlap of emission.

It is contemplated herein that it may be desirable to produce RF emission using laser-based techniques. Given that RF emission decreases exponentially as a function of distance from the source, it is advantageous in many applications to generate the emission locally.

It is further contemplated herein that laser-produced plasmas may create transient micro-plasmas in which electrons and ions have very different energy distributions, which causes exceedingly large dipole currents that result in the emission of RF radiation. Notably, RF emission may be generated on a target through traditional optical focusing techniques and/or through laser filamentation since laser filaments may provide sufficient laser intensity on the target. In either case, the incident laser irradiance is sufficient to produce highly energetic electrons on the surface of the target material which are accelerated to high velocities within the plasma due to Coulombic attraction and the driving laser field. High-energy electrons will radiate in the electro-magnetic spectrum as they propagate and slow down, with the energy of the electron setting the range of the electromagnetic spectrum into which they radiate. Due to differences in the plasma and the gradient of the laser field, the high energy electrons will have a broad range of energy distributions, thus creating a broad spectral emission. In addition to broadband RF generation from laser plasmas, the materials themselves often generate unique spectral emission in the RF regime. This emission is a combination of broad and narrowband emission lines generated from various kinetic modes of movement of the molecules liberated by the laser plasma, and can be used for production of specific emission.

Given that RF emission decreases exponentially as a function of distance from the source, it is advantageous in many applications to generate the emission locally. For these remote applications, laser filaments are an ideal solution given that the associated plasmas are RF generators.

Figure 5A:
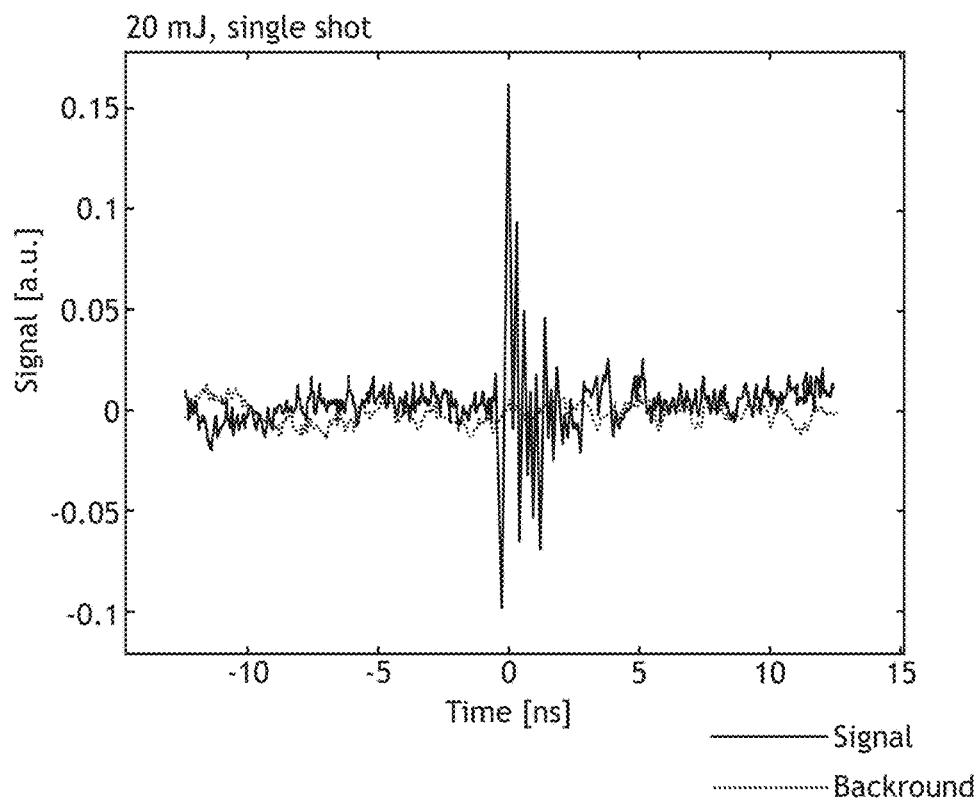
FIG. 5A is a time-domain plot of a single-shot filament from a 20 mJ pulse in accordance with one or more embodiments of the present disclosure.
Figure 5B:
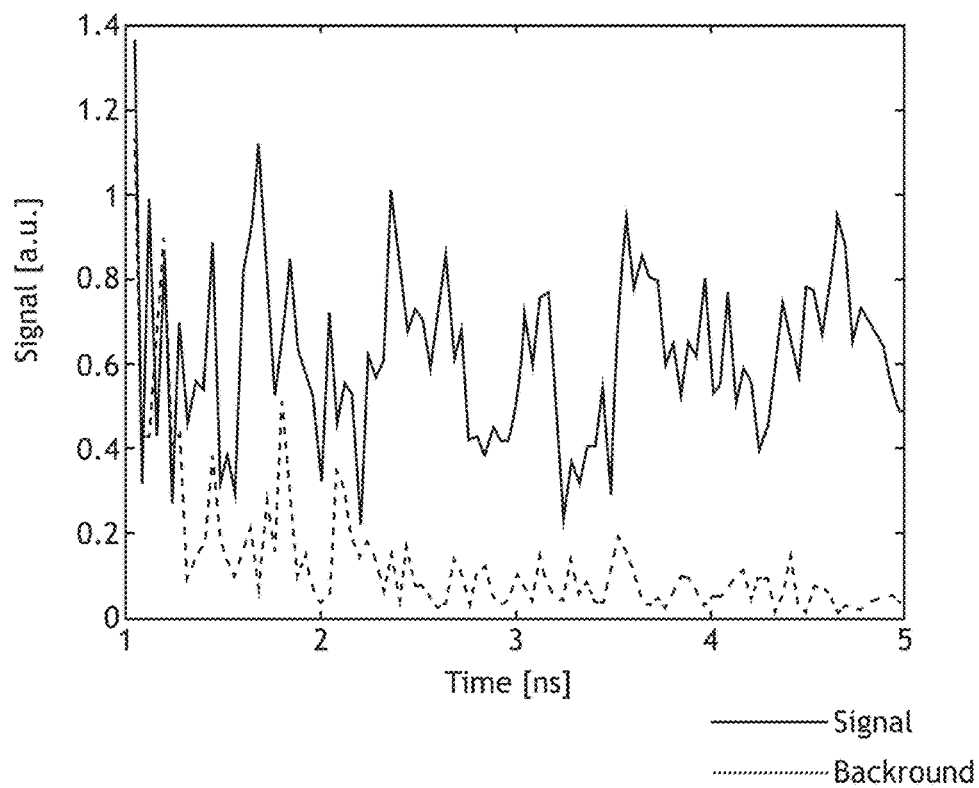
FIG. 5B is a plot of the resulting broadband RF emission in air in accordance with one or more embodiments of the present disclosure.

RF emission in air from laser filaments is typically broadband with no clear structure and peaks that vary from shot to shot. FIGS. 5A and 5B illustrate RF emission in air from single-shot laser filaments. FIG. 5A is a time-domain plot of a single-shot filament from a 20 mJ pulse in accordance with one or more embodiments of the present disclosure. FIG. 5B is a plot of the resulting broadband RF emission in air in accordance with one or more embodiments of the present disclosure.

Figure 6A:
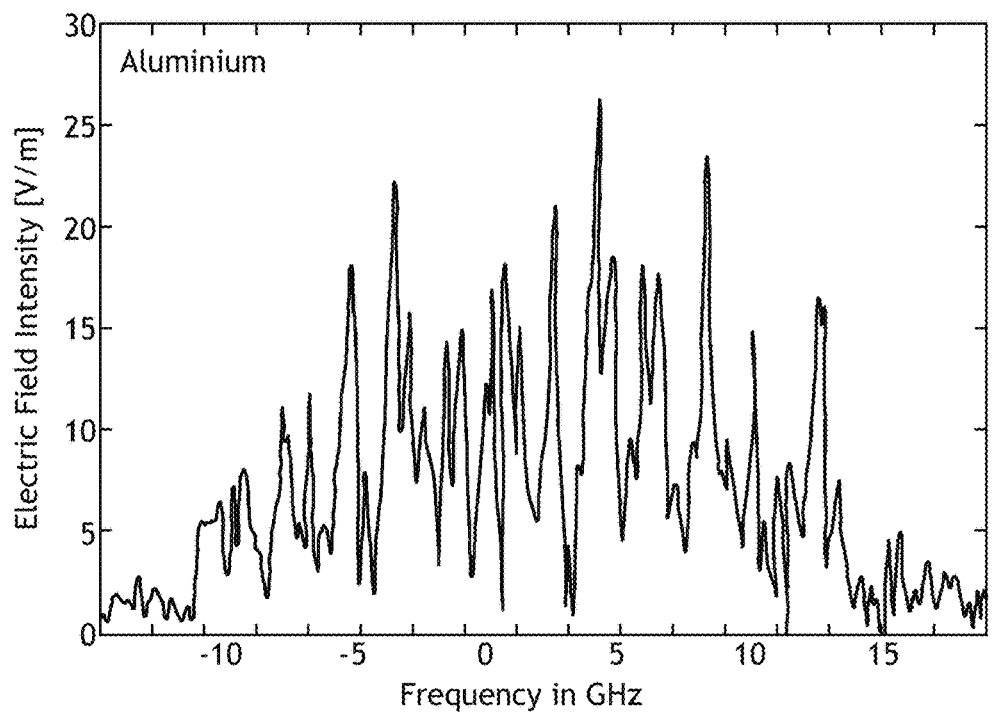
FIG. 6A is a plot of RF emission on aluminum in accordance with one or more embodiments of the present disclosure.
Figure 6B:
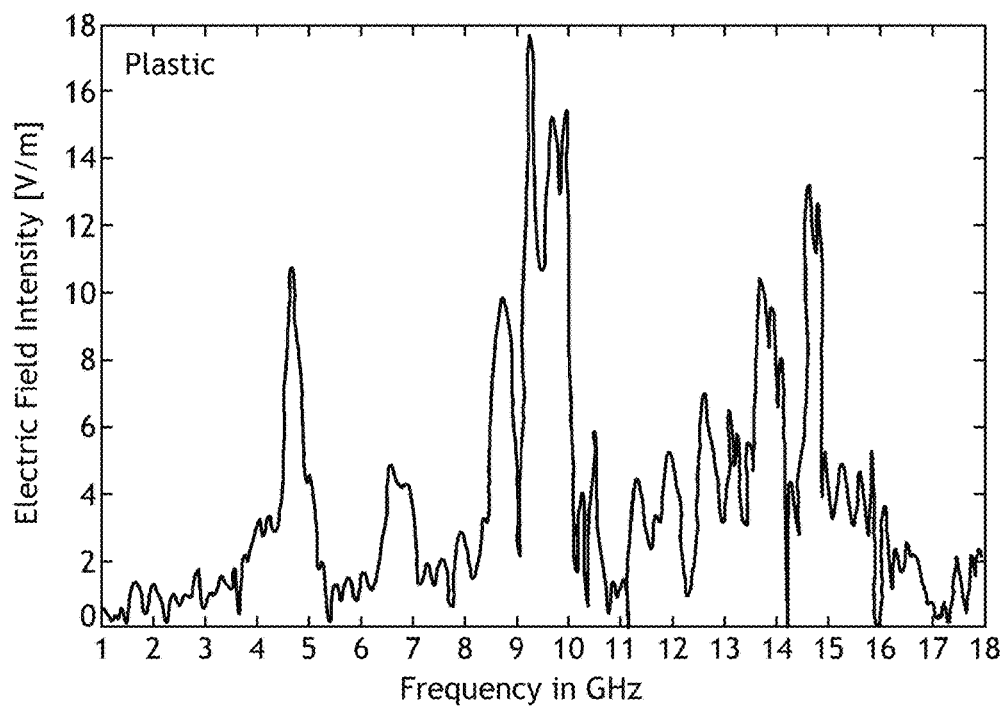
FIG. 6B is a plot of RF emission on plastic in accordance with one or more embodiments of the present disclosure.

RF emission from a plasma generated on a target surface may have unique RF signatures depending on the material properties. FIG. 6A is a plot of RF emission on aluminum in accordance with one or more embodiments of the present disclosure. FIG. 6B is a plot of RF emission on plastic in accordance with one or more embodiments of the present disclosure. The peaks in the RF signal were fixed and did not change based on laser pulse parameters, which illustrates that it is generally not possible to customize or generate specific RF tones at distance using traditional techniques.

In some embodiments, an amplified patterned burst-mode beam 112 is designed to deliberately engineer or otherwise control the form of the micro-plasma and the broadband plasma emission as a periodic pulse function in the spectral domain. By stacking two or more broadband RF pulses at specific temporal spacing, new RF frequencies are generated with one central RF tone centered at the inverse of the temporal spacing, and the harmonics thereof. Non uniform and mixed periodicity pulse spacings may be generated using this same method, which would produce multi-toned RF emission. As a result, one or more selected RF tones may be generated on a target at either short distances through traditional focusing techniques or at long distances through filamentation by controlling the pattern of inter-pulse spacings and/or amplitudes within an amplified patterned burst-mode beam 112.

Figure 7A:
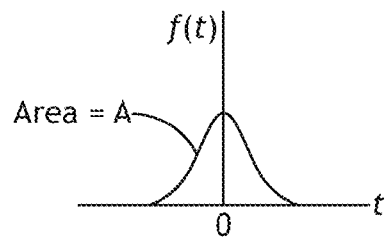
FIG. 7A illustrates a pulse function, which may represent the time-domain signal of the laser produced RF generated by the amplified patterned burst-mode beam in accordance with one or more embodiments of the present disclosure.
Figure 7B:
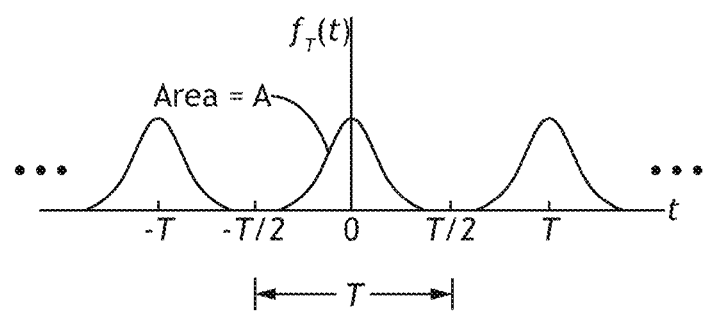
FIG. 7B illustrates a three pulsed periodic function in accordance with one or more embodiments of the present disclosure.
Figure 7C:
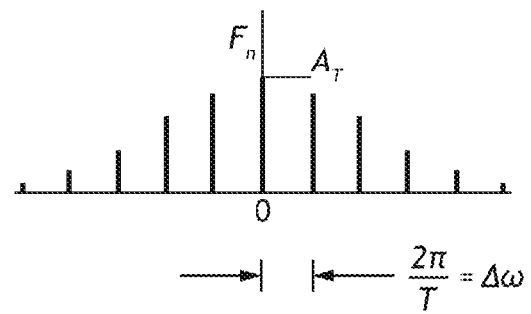
FIG. 7C illustrates the resulting Fourier transform of the pulsed periodic function in the RF spectrum, where the frequency of the generated spectral tones is related to the pulse separation, where the peak tone is $F_n$ in accordance with one or more embodiments of the present disclosure.

The Fourier transform of a periodic function is defined by:

$$f_T(t) \equiv \sum_{n=-\infty}^{\infty} f(t - nT)$$

where f(t) is a time function, which is repeated n times the period of separation T. FIG. 7A illustrates a pulse function, which may represent the time-domain signal of the laser produced RF generated by the amplified patterned burst-mode beam 112 in accordance with one or more embodiments of the present disclosure. FIG. 7B illustrates a three pulsed periodic function in accordance with one or more embodiments of the present disclosure. FIG. 7C illustrates the resulting Fourier transform of the pulsed periodic function in the RF spectrum, where the frequencies of the generated spectral tones are related to the pulse separation, where the peak tone is $F_n$ in accordance with one or more embodiments of the present disclosure.

Thus, a coaxial sequence of laser pulses of a known period or inter-pulse spacing T associated with an amplified pulse burst 210 will create a pulsed RF emission with the same period T as the laser pulses when the pulses interact with a material and create a plasma. The RF emission will additionally create, by means of the Fourier transform above, RF tones at the inverse of the period, or frequency F. This provides the ability to translate coaxial laser pulses into RF pulses which in turn create RF tones. It is noted herein that non-coaxial pulses or non-overlapping pulses on the target such as those associated with spatio-temporal filament arrays described above will also generate the same effect as long as the plasma and RF are able to interact. For example, spatially separated plasmas generated by rings or lines of filaments would still generate this RF tone effect so long as they are engineered such that they interact.

Figure 8A:
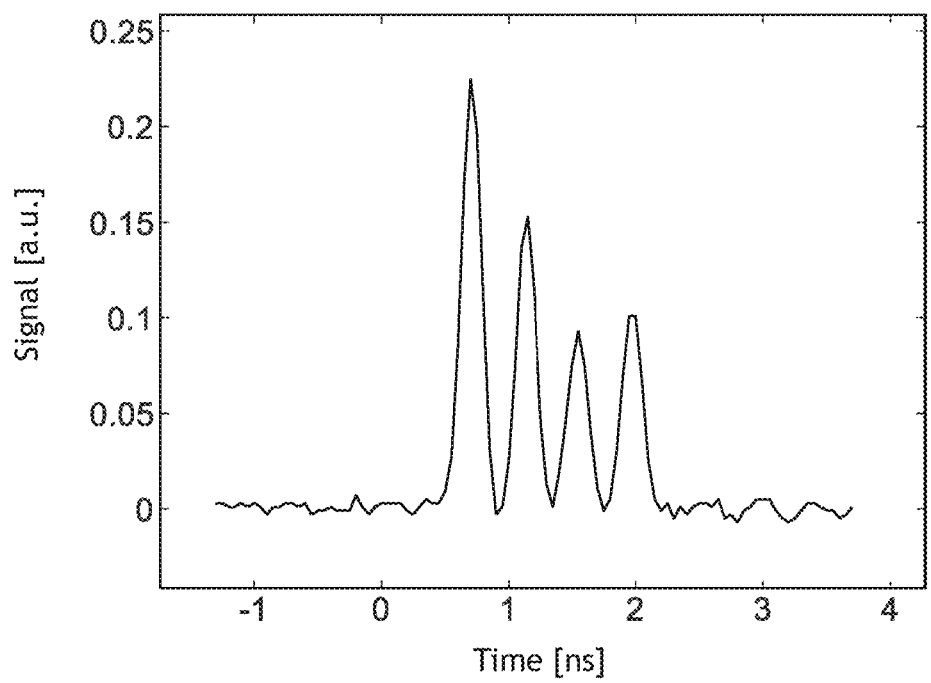
FIG. 8A is a plot illustrating an amplified pulse burst including four pulses separated by 400 ps each, in accordance with one or more embodiments of the present disclosure.
Figure 8B:
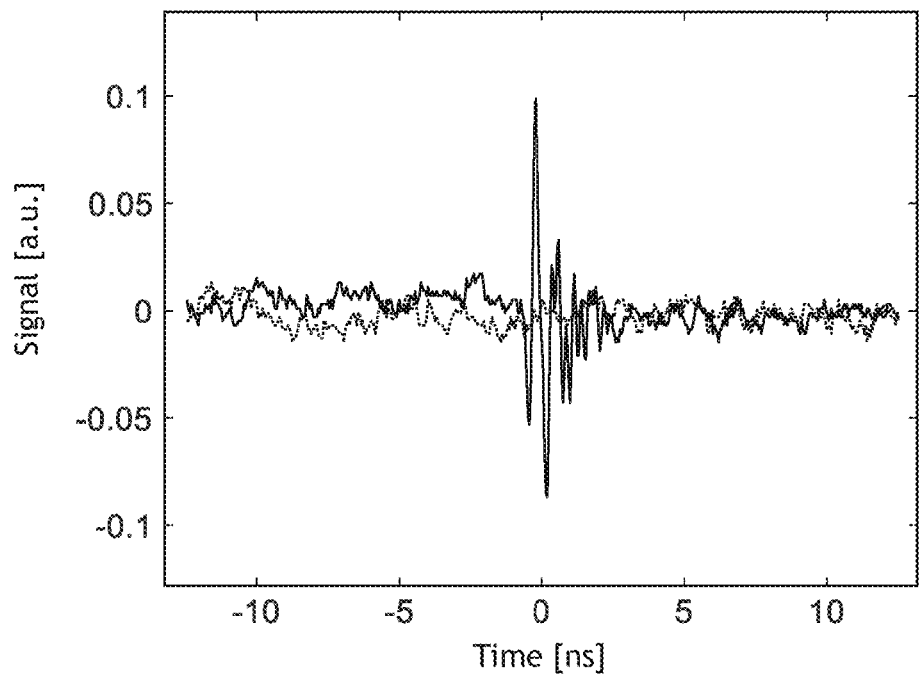
FIG. 8B is a plot of the time-domain RF signal generated by configuring the laser pulses of FIG. 8A to propagate over 7 meters to a metal target, in accordance with one or more embodiments of the present disclosure.
Figure 8C:
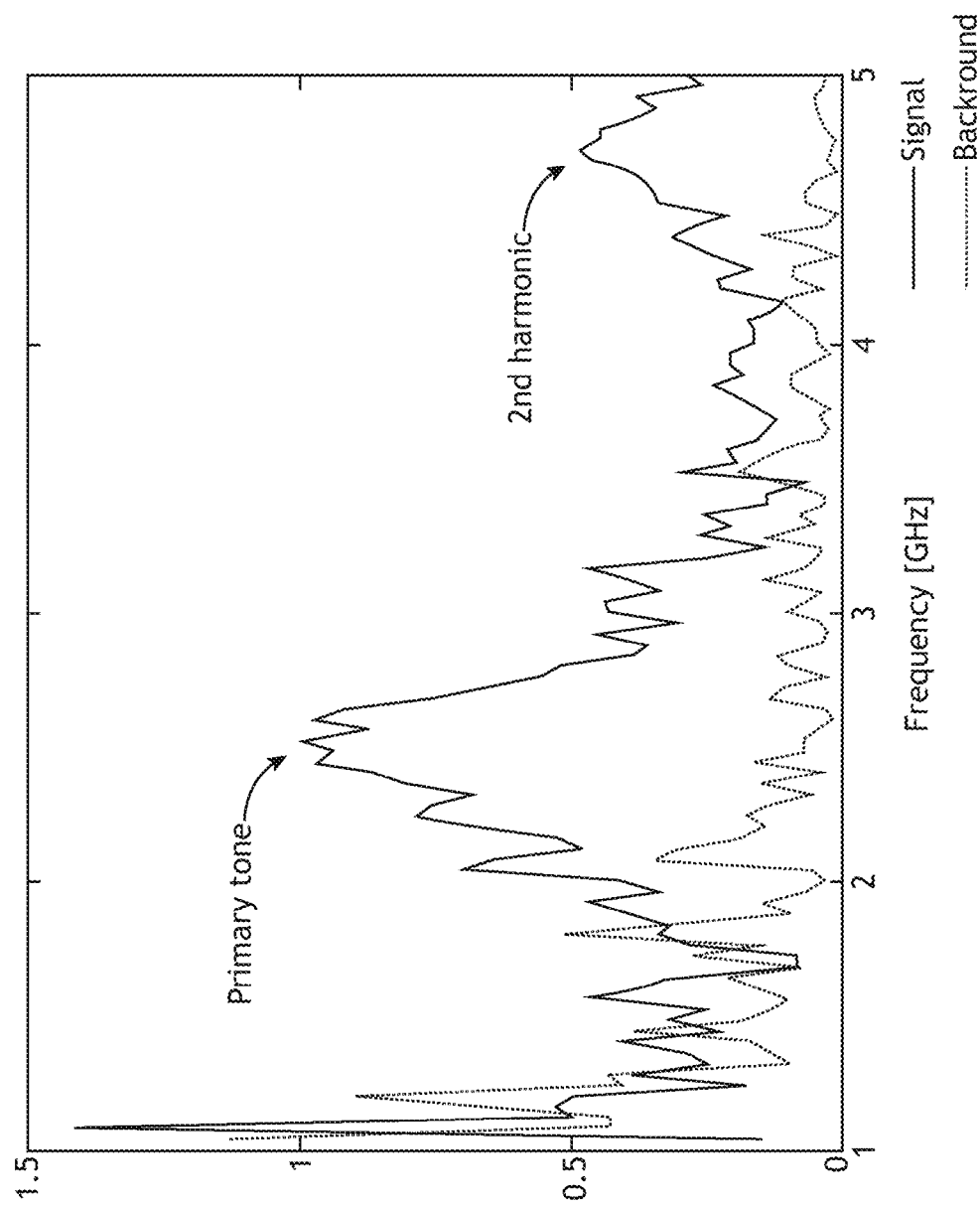
FIG. 8C is a plot of the frequency spectrum of the RF signal generated by taking a Fourier transform of the signal in FIG. 8B, in accordance with one or more embodiments of the present disclosure.

FIGS. 8A through 8C illustrate an experimental demonstration of the generation of a selected RF tone at 2.4 GHz using an amplified patterned burst-mode beam 112. FIG. 8A is a plot illustrating an amplified pulse burst 210 including four pulses separated by 400 ps each, in accordance with one or more embodiments of the present disclosure. The pulse spacing was measured via a photodiode, where the width of the pulses is not to scale due to the time resolution of the detector.

FIG. 8B is a plot of the time-domain RF signal generated by configuring the laser pulses of FIG. 8A to propagate over 7 meters to a metal target, in accordance with one or more embodiments of the present disclosure. As described previously herein, the individual pulse strengths of the amplified pulse burst 210 in FIG. 8A are adjustable and may be adjusted to alter the RF emission. Note that although there were 4 laser pulses in the amplified pulse burst 210 of FIG. 8A, the RF regime illustrated in FIG. 8B has a different shape due to constructive and destructive interference.

FIG. 8C is a plot of the frequency spectrum of the RF signal generated by taking a Fourier transform of the signal in FIG. 8B, in accordance with one or more embodiments of the present disclosure. As illustrated in FIG. 8C, the RF signal generated on the target includes a peak at 2.4 GHz, which corresponds to the 400 ps inter-pulse spacing of the amplified pulse burst 210, as well as a second-harmonic signal. Note the significant difference over the background spectrum (red), proving the RF tone is a result of the pulsed periodic laser plasma. These experiments have been repeated both under normal laser focusing conditions as well as at distance using laser filaments.

Figure 9:
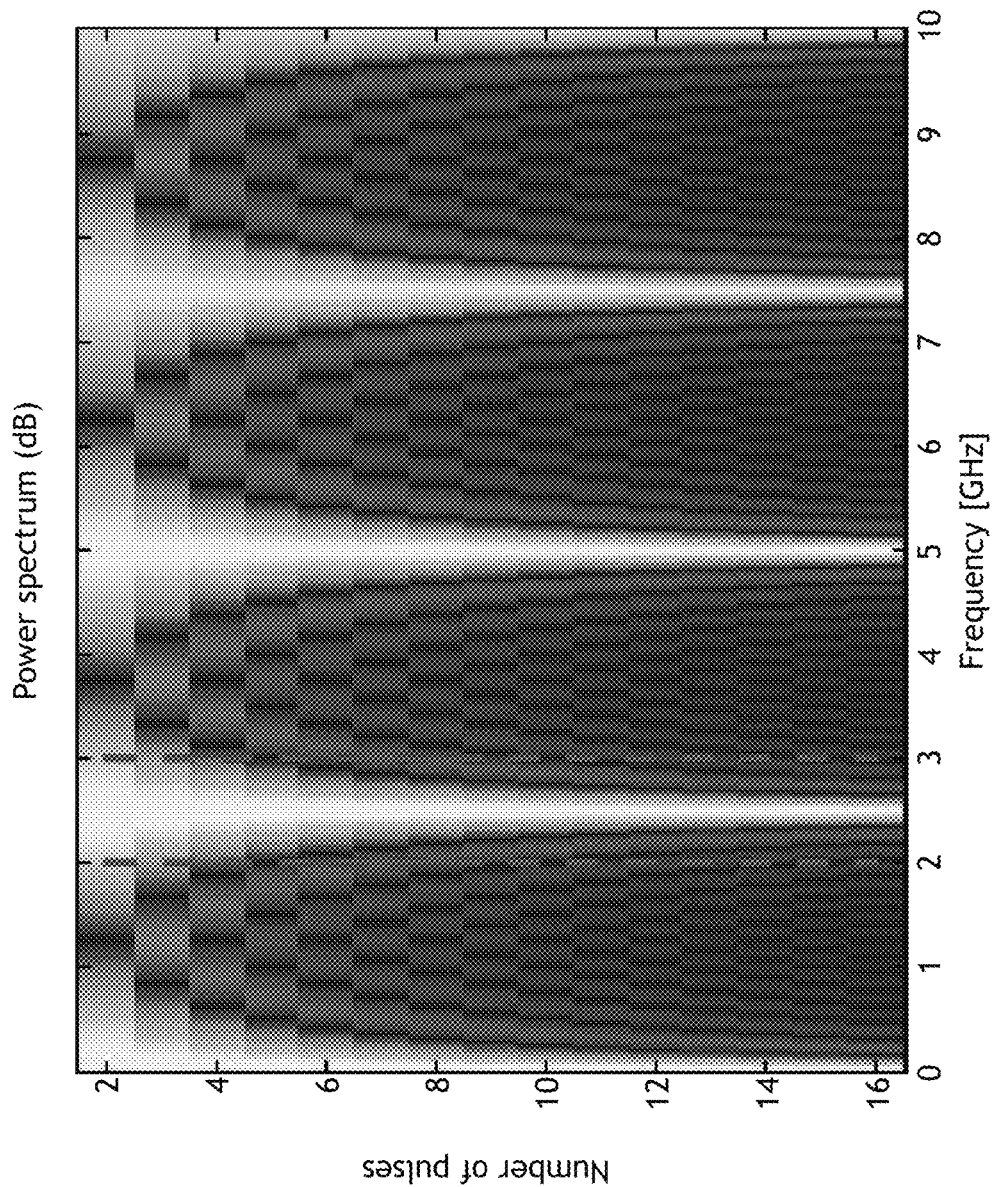
FIG. 9 is a simulated plot of a generated RF power spectrum as a function of the number of pulses in an amplified pulse burst, in accordance with one or more embodiments of the present disclosure.

It is further contemplated herein that the bandwidth of RF tones generated using an amplified pulse burst 210 may be controlled based on the number of pulses in the amplified pulse burst 210. FIG. 9 is a simulated plot of a generated RF power spectrum as a function of the number of pulses in an amplified pulse burst 210, in accordance with one or more embodiments of the present disclosure. The fundamental tone at 2.4 GHz as well as the harmonics become narrower as the number of pulses increases. While the simulation illustrated in FIG. 9 was limited to 16 pulses, the trend continues as the number of pulses in an amplified pulse burst 210 increases.

Thus, tunable narrowband RF emission using periodic laser plasmas generated through a tailored amplified patterned burst-mode beam 112 is shown herein. Utilizing the natural propagation of laser filaments, this invention provides a new means of RF generation at distances of kilometers from the laser source, opening up many new applications.

Figure 10:
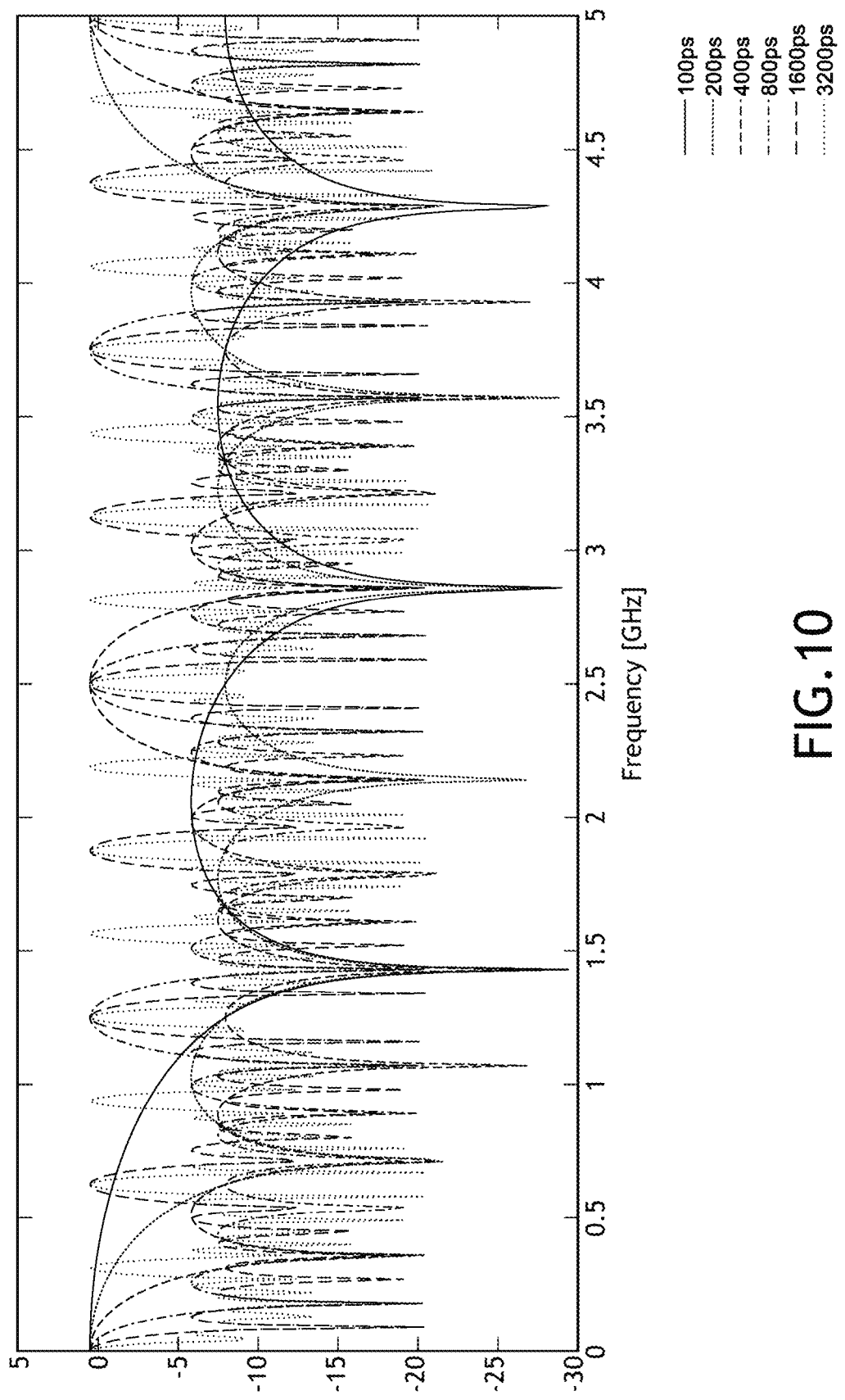
FIG. 10 is a plot illustrating broadband RF emission generated using this technique in accordance with one or more embodiments of the present disclosure.

In some embodiments, an amplified patterned burst-mode beam 112 is designed to generate broadband RF emission using multiple RF tones generated as illustrated in FIGS. 7A through 9. As described previously herein, the burst-mode laser system 100 may generate an amplified patterned burst-mode beam 112 including an amplified pulse burst 210 with constituent pulses having different inter-pulse spacings, or multiple output amplified pulse bursts 210 having different inter-pulse spacings. Accordingly, multiple RF tones may be generated with an amplified patterned burst-mode beam 112. With a large number of pulses, tones at a wide range of frequencies, and their harmonics, can be produced simultaneously without sacrificing signal strength. FIG. 10 is a plot illustrating broadband RF emission generated using this technique in accordance with one or more embodiments of the present disclosure. In FIG. 10, the legend refers to the inter-pulse spacings associated with various constituent pulses in an amplified patterned burst-mode beam 112.

In some embodiments, an amplified patterned burst-mode beam 112 is designed to provide efficient ablation or modify one or more properties of a material in a controlled manner. For example, an ultra-short pulse having energy density or fluence exceeding the ablation threshold and plasma formation threshold of the target exposed to it will generate a plasma, ejecting material and producing a shockwave propagating into the surrounding environment as well as into the bulk of the sample. If the plasma is sufficiently dense, subsequent laser pulses will interact with it. The absorption of laser energy by the ejected plasma can affect the material removal in a number of ways including re-energizing particulates in the plasma preventing condensation and redistribution of material in and around the crater, heating the plasma and confining high temperatures and pressures to the sample surface assisting the material removal via thermal mechanisms, generating a shockwave on the pre-existent shock front that clears molten material from the interaction zone, and shielding laser energy from the target so that less ablation occurs. The resulting ablation is thus due to a number of complex mechanisms and strongly dependent on the timing of the subsequent pulses. The effects of multi-pulse ablation using nanosecond and femtosecond pulses are generally described in H. Kerrigan, et al., "Nanosecond laser coupling for increased filament ablation," Opt. Lett. 44(10), pp. 2594-2597 (2019) and H. Kerrigan, et al., "Ultrafast diagnostics of augmented filament ablation", Proc. SPIE 11051, 32nd International Congress on High-Speed Imaging and Photonics, 110510E (2019), both of which are incorporated herein by reference in their entirety.

Figure 11:
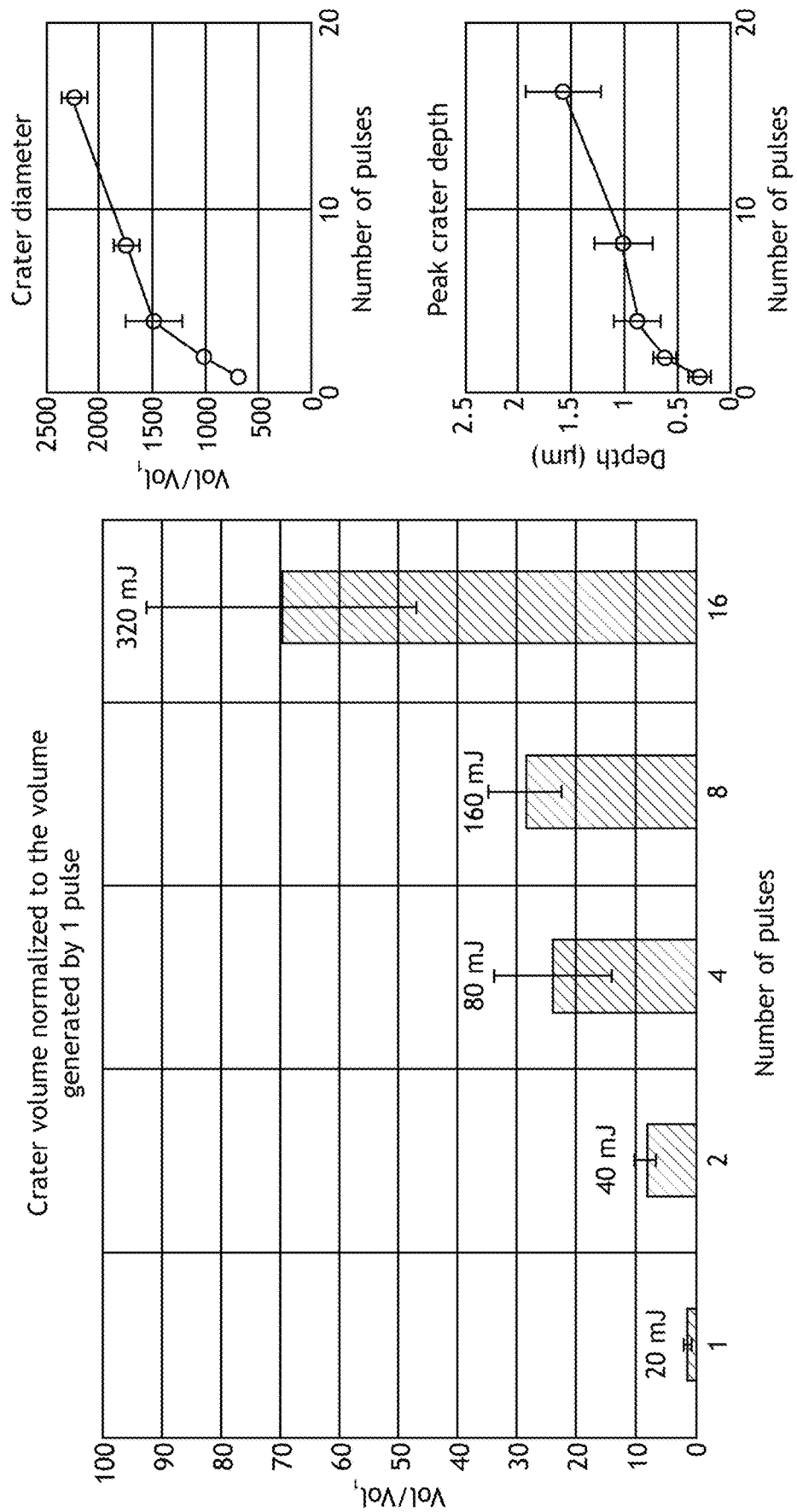
FIG. 11 is a series of plots illustrating the crater volume, crater diameter, and peak crater depth for ablation of silicon using an amplified pulse burst including up to 16 pulses, in accordance with one or more embodiments of the present disclosure.

FIG. 11 is a series of plots illustrating the crater volume, crater diameter, and peak crater depth for ablation of silicon using an amplified pulse burst 210 including up to 16 pulses, in accordance with one or more embodiments of the present disclosure. In this experiment, each pulse in the amplified pulse burst 210 had a pulse energy of 20 mJ and the pulses were equally spaced with an inter-pulse spacing of 400 ps. As illustrated in FIG. 11, increasing the pulse number removed more volume by increasing both the crater depth and diameter. At 16 pulses, corresponding to 16× the energy compared to one pulse, 70× enhancement in the ablated volume was observed. Further enhancements to the material removal are achieved through precise tuning of the subsequent pulses to account for the complex laser-plasma and material interactions. Additionally, although not shown, similar effects have been demonstrated on a wide range of materials.

In some embodiments, an amplified patterned burst-mode beam 112 is designed to provide acoustic signals and/or shockwaves on a target. In this regard, the associated acoustic signals and/or shockwaves may be sufficient to disrupt sensors or other electronics located on a target. For example, a burst of pulses at 640 mJ has been experimentally shown to produce an audio signal exceeding 100 dBA recorded 1 m away from the target.

Figure 12A:
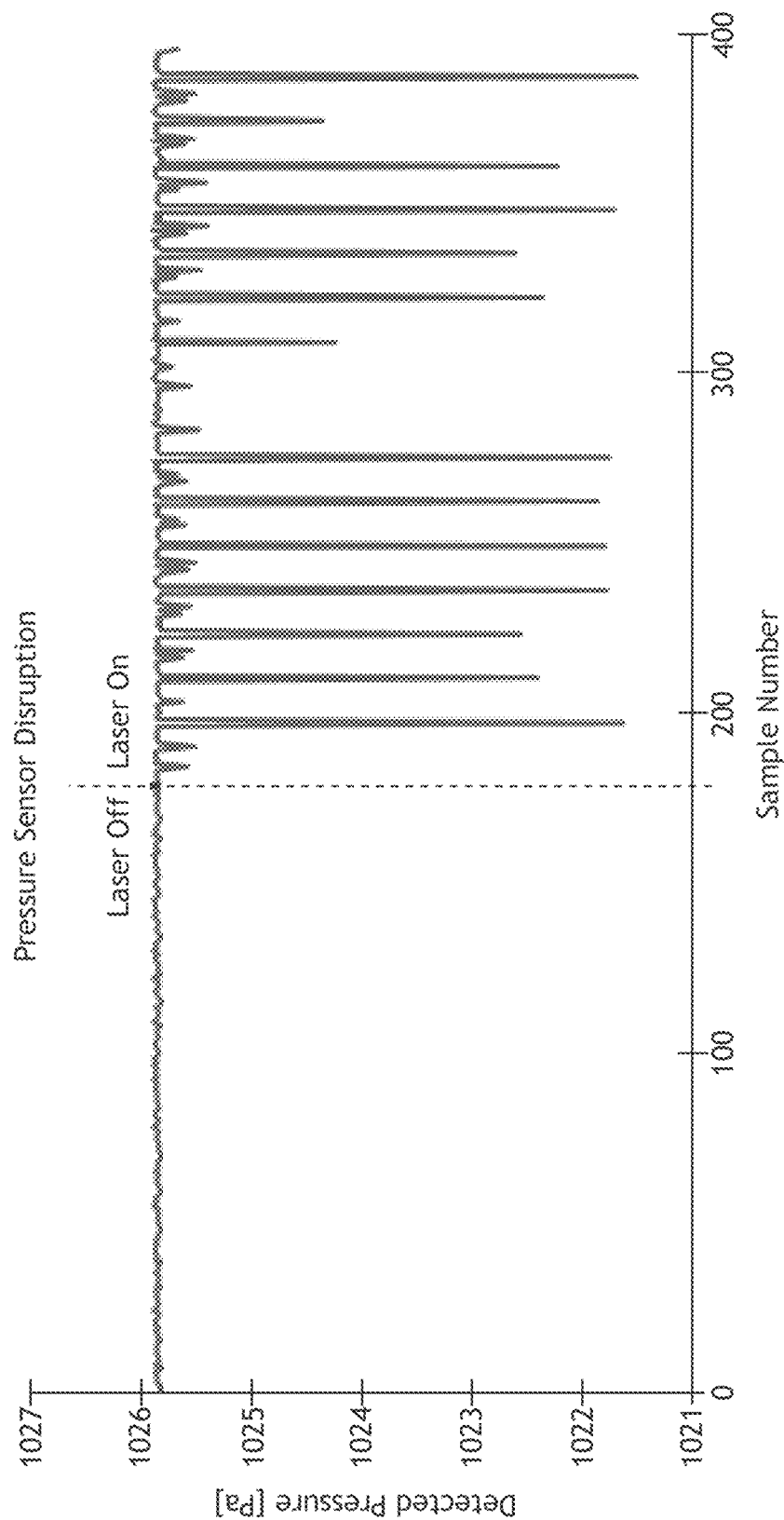
FIG. 12A is a plot illustrating disruption of a pressure sensor (BMP280) using an amplified patterned burst-mode beam, in accordance with one or more embodiments of the present disclosure.
Figure 12B:
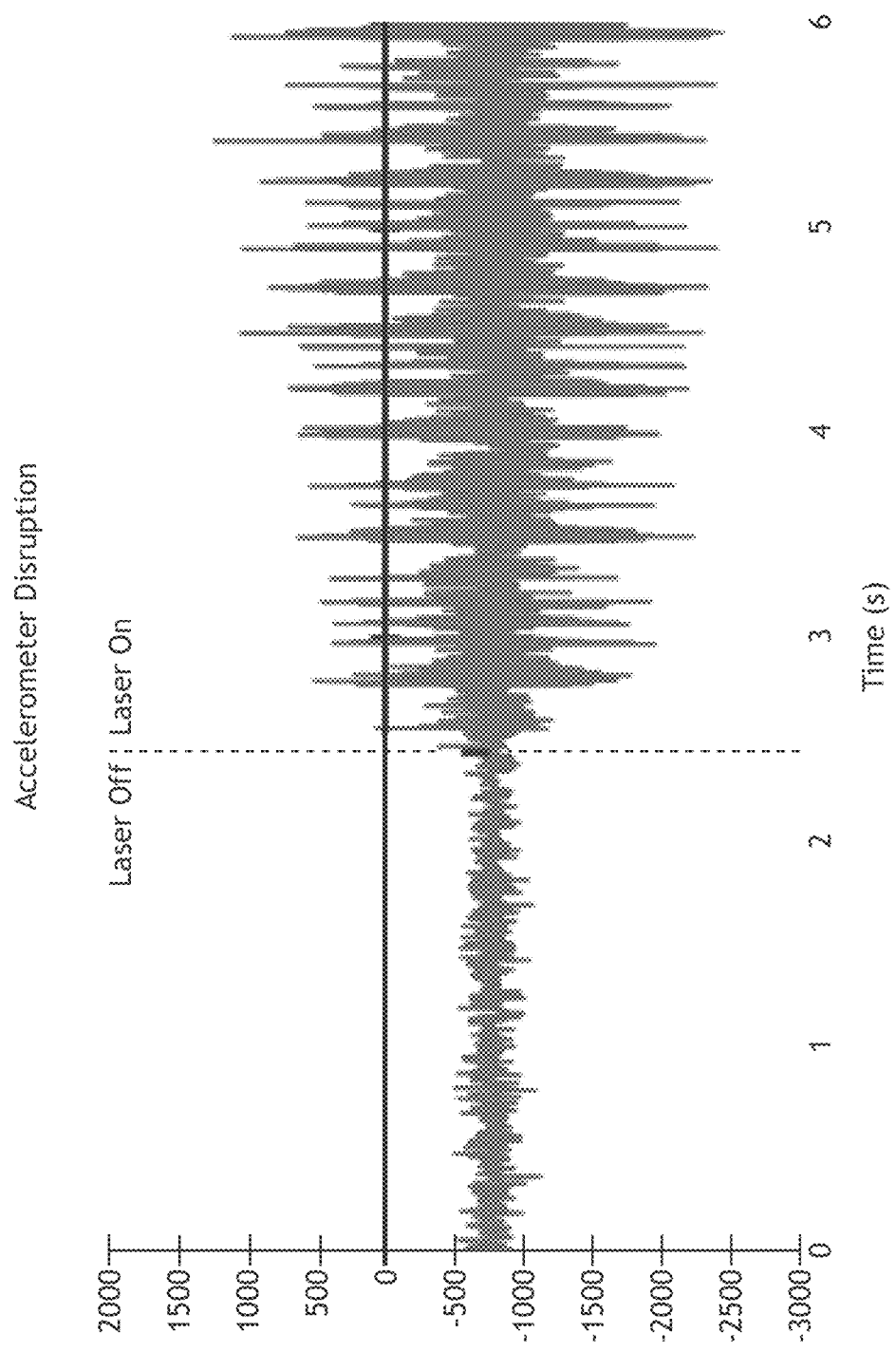
FIG. 12B is a plot illustrating disruption of an accelerometer (MPU-6050) using an amplified patterned burst-mode beam, in accordance with one or more embodiments of the present disclosure.

FIG. 12A is a plot illustrating disruption of a pressure sensor using an amplified patterned burst-mode beam 112, in accordance with one or more embodiments of the present disclosure. FIG. 12B is a plot illustrating disruption of an accelerometer using an amplified patterned burst-mode beam 112, in accordance with one or more embodiments of the present disclosure.

The enhanced pressure wave produced by the burst of femtosecond pulses was sufficient to disrupt electronic devices including atmospheric pressure sensors and micro-electromechanical systems (MEMS)-type sensors located within a PVC box subjected to the amplified patterned burst-mode beam 112. The strong acoustic shockwave produced by the filament burst "confuses" the device by rapidly changing the pressure around the sensors and physically shaking it. Disruption is evident in the sensor readings that show large changes in pressure, acceleration, or gyroscopic movement while the device is stationary in the enclosed box struck by the laser. Further, although not shown, disruption was observed at a variety of laser energies as well as when the shockwaves were produced in air adjacently to the target. These experiments were also conducted at 10 m and 20 m with similar results.

In some embodiments, an amplified patterned burst-mode beam 112 is designed to generate X-rays on a target. When a pulse hits target and interacts with material, electrons are ejected from the surface with keV of energy. In the presence of the Coulomb field generated by the charge separation of electrons from the target surface, the electrons return to the surface, ionizing electrons from the innermost shells of the atoms. An electron dropping to this level emits x-ray radiation. For example, $k_\alpha$ emission of copper is at 8,047.78 eV. This radiation is detected using a photo-multiplier tube (PMT) and all other radiation is filtered out using a filter, typically a thin metal with the proper absorption properties. Filaments are capable of producing $k_\alpha$ x-ray radiation as their peak intensity (~$10^{14}$ W/cm$^2$ for a filament centered at 800-nm in air) exceeds the ablation threshold of materials, ejecting electrons from the surface of a target struck by a filament. The enhanced laser-material and laser-plasma interactions in burst mode ablation (describe above) improve the generation of free-carrier electrons from the target surface, increasing the $k_\alpha$ emission. The ability of filaments to propagate such intensities to distant targets combined with burst mode $k_\alpha$ emission enhancement makes remote x-ray generation feasible.

In some embodiments, an amplified patterned burst-mode beam 112 is designed to generate a supercontinuum (e.g., white light generation) on a target. White-light generation during filamentation is a result of the nonlinear physics that occur during filamentation. Self-phase-modulation, self-steepening, and ionization of the medium cause spectral broadening of the light in the laser pulse. Self-phase modulation involves the rise of new frequencies towards both the blue and infra-red as a result of the variation of pulse intensity with time which corresponds to temporal changes in the nonlinear refractive index. The temporal changes in refractive index with pulse intensity also cause the high-intensity part of the pulse to propagate slower than the trailing part of the pulse. The steep edge formed in the trailing part of the pulse, called self-steepening, increases the generation of frequencies towards the blue part of the spectrum. As the pulse self-focuses, the high intensities on axis ionize the medium through multi-photon ionization (MPI) and tunneling ionization. The radiation from the electronic transitions of atoms and molecules ionized by the pulse produces white light in the visible part of the spectrum. Additionally, the presence of plasma intensifies the effects of self-phase modulation and self-steepening. The instantaneous frequency of light generated in the presence of the plasma may be described as:

$$\omega(t) = -\frac{d\phi}{dt} \sim \omega_0 + \frac{\omega_0 z}{c}\left(-n_2 \frac{\partial I(r,t)}{\partial t} + \frac{1}{2n_0 \rho_c}\frac{\partial \rho(r,t)}{\partial t}\right)$$

Figure 13A:
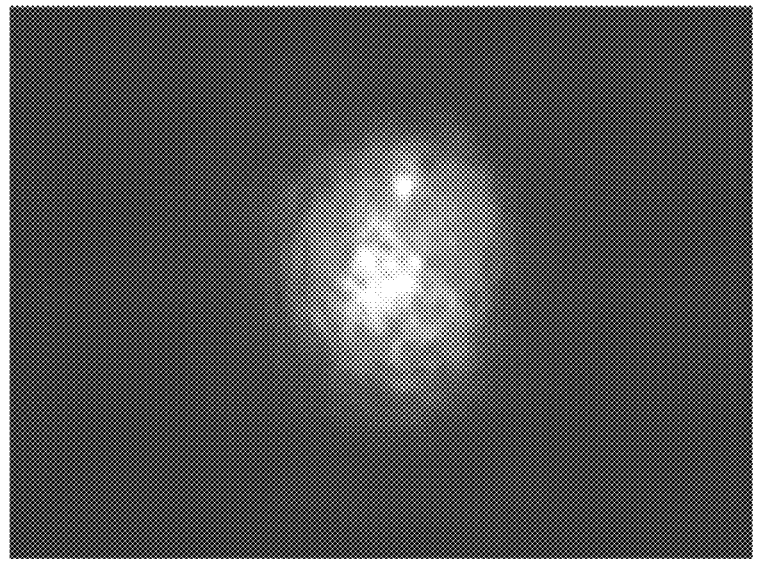
FIG. 13A is an image of white light generated using a single laser pulse in accordance with one or more embodiments of the present disclosure.
Figure 13B:
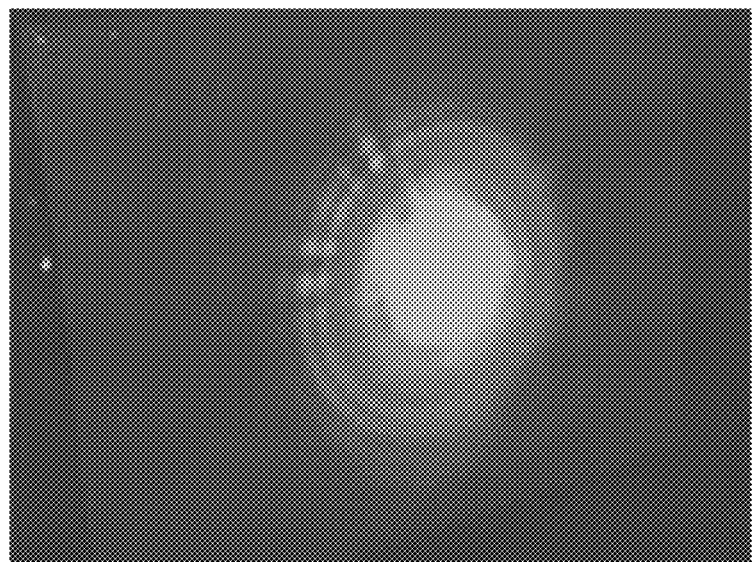
FIG. 13B is an image of white light generated using an amplified patterned burst-mode beam in accordance with one or more embodiments of the present disclosure.

In burst mode filamentation, pulses in an amplified pulse burst 210 can be spaced to enhance plasma generation, as described above with respect to filament stitching. The enhanced plasma leads to superior super-continuum generation. FIG. 13A is an image of white light generated using a single laser pulse in accordance with one or more embodiments of the present disclosure. FIG. 13B is an image of white light generated using an amplified patterned burst-mode beam 112 in accordance with one or more embodiments of the present disclosure.

Referring now generally to FIGS. 1A-1C, various aspects for the control of the burst-mode laser system 100 are described in greater detail in accordance with one or more embodiments of the present disclosure.

In one embodiment, the burst-mode laser system 100 includes a controller 132. The controller 132 may include one or more processors 134 configured to execute program instructions maintained on memory 136 or memory medium. In this regard, the one or more processors 134 of the controller 132 may execute any of the various process steps described throughout the present disclosure.

In one embodiment, the controller 132 controls or adjusts (e.g., via control signals) various components of the burst-mode laser system 100 such as, but not limited to, the seed laser 102, the pulse pattern generator 106, the one or more power amplifiers 110, or any components therein. For example, the controller 132 may control or adjust the inter-pulse spacings in the intermediate patterned burst-mode beam 108 by directing the pulse pattern generator 106 or components therein (e.g., translation stages, or the like) to adjust optical path lengths of one or more delay paths 120. By way of another example, the controller 132 may control or adjust a pattern of amplitudes of the intermediate patterned burst-mode beam 108 by directing the pulse pattern generator 106 or components therein (e.g., filters, beamsplitters, or the like) to adjust the transmittance of one or more delay paths 120. By way of another example, the controller 132 may control or adjust the gain characteristics of the one or more power amplifiers 110 or components therein (e.g., pump lasers, or the like) to provide selected gain for various pulses in the intermediate patterned burst-mode beam 108.

In another embodiment, the controller 132 receives a selected configuration of the amplified patterned burst-mode beam 112 and directs at least one of the pulse pattern generators 106 or the power amplifiers 110 to generate the amplified patterned burst-mode beam 112 having the selected configuration. For example, the selected configuration of the amplified patterned burst-mode beam 112 may include, but is not limited to, at least one of the pattern of inter-pulse spacings, a pattern of amplitudes of the laser pulses in the intermediate patterned burst-mode beam 108, the pattern of amplitudes of the amplified laser pulses in the amplified patterned burst-mode beam 112, or the number of the amplified laser pulses in a particular amplified pulse burst 210 of the amplified patterned burst-mode beam 112.

In another embodiment, the controller 132 receives a selected light-matter interaction characteristic to generate with the amplified patterned burst-mode beam 112, determines a configuration of the amplified patterned burst-mode beam 112 to provide the selected light-matter interaction characteristic, and directs at least one of the pulse pattern generators 106 or the power amplifiers 110 to generate the amplified patterned burst-mode beam 112 having the selected configuration. Similarly, the selected configuration of the amplified patterned burst-mode beam 112 may include, but is not limited to, at least one of the pattern of inter-pulse spacings, a pattern of amplitudes of the laser pulses in the intermediate patterned burst-mode beam 108, the pattern of amplitudes of the amplified laser pulses in the amplified patterned burst-mode beam 112, or the number of the amplified laser pulses in a particular amplified pulse burst 210 of the amplified patterned burst-mode beam 112. For example, the controller 132 may determine the configuration of the amplified patterned burst-mode beam 112 to provide the selected light-matter interaction characteristic based on one or more models (e.g., a light-matter interaction model, an optical model, or the like), one or more simulations, experimental data, or a combination thereof.

As an illustration, the controller 132 may receive a selected RF spectrum (e.g., one or more selected RF tones, a broadband spectrum of RF tones, or the like) to generate on a known or unknown target material. The controller 132 may then apply a Fourier transform model to the selected RF spectrum as described previously herein to determine the selected configuration of the amplified patterned burst-mode beam 112 suitable for generating the selected RF spectrum.

Similarly, the controller 132 may receive various other on-target effects such as, but not limited to, generation of a selected audio spectrum, generation of an audio signal with a selected amplitude, generation of a selected spectrum of light (e.g., X-rays, white light, supercontinuum light, or the like), or filamentation characteristics (e.g., temporal stitching, or the like). The controller 132 may then determine a suitable configuration of the amplified patterned burst-mode beam 112 for generating any of the various on-target effects either simultaneously or sequentially based on associated models, simulations, or experimental data.

The one or more processors 134 of a controller 132 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 134 may include any device configured to execute algorithms and/or instructions (e.g., program instructions stored in memory). In one embodiment, the one or more processors 134 may be embodied as a desktop computer, mainframe computer system, workstation, image computer, parallel processor, networked computer, or any other computer system configured to execute a program configured to operate or operate in conjunction with the burst-mode laser system 100, as described throughout the present disclosure Moreover, different subsystems of the burst-mode laser system 100, such as the seed laser 102 (or any associated pump lasers), the pulse pattern generator 106, any of the one or more power amplifiers 110 (or any associated pump lasers) may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller 132 or, alternatively, multiple controllers. Additionally, the controller 132 may include one or more controllers housed in a common housing or within multiple housings. In this way, any controller or combination of controllers may be separately packaged as a module suitable for integration into burst-mode laser system 100.

The memory 136 may include any storage medium known in the art suitable for storing program instructions executable by the associated one or more processors 134. For example, the memory 136 may include a non-transitory memory medium. By way of another example, the memory 136 may include, but is not limited to, a read-only memory (ROM), a random-access memory (RAM), a magnetic or optical memory device (e.g., disk), a magnetic tape, a solid-state drive and the like. It is further noted that the memory 136 may be housed in a common controller housing with the one or more processors 134. In one embodiment, the memory 136 may be located remotely with respect to the physical location of the one or more processors 134 and/or the controller 132. For instance, the one or more processors 134 may access a remote memory (e.g., server), accessible through a network (e.g., internet, intranet and the like).

In one embodiment, the burst-mode laser system 100 includes a user interface 138, which may be communicatively coupled to the controller 132. In one embodiment, the user interface 110 may include, but is not limited to, one or more desktops, laptops, tablets, and the like. In another embodiment, the user interface 138 includes a display used to display data of the burst-mode laser system 100 to a user. The display of the user interface 138 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 138 is suitable for implementation in the present disclosure. In another embodiment, a user may input selections and/or instructions responsive to data displayed to the user via a user input device of the user interface 138.

Figure 14:
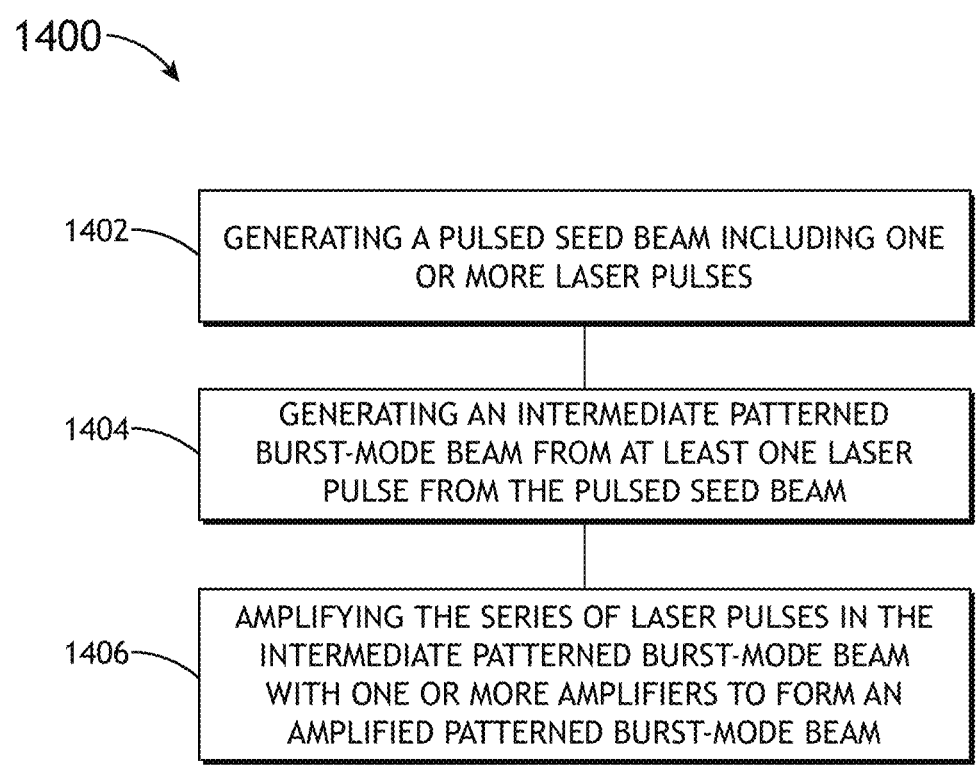
FIG. 14 is a flow diagram illustrating steps performed in a method for generating an amplified patterned burst-mode beam, in accordance with one or more embodiments of the present disclosure.

Referring now to FIG. 14, controlling an amplified patterned burst-mode beam 112 is described in accordance with one or more embodiments of the present disclosure.

FIG. 14 is a flow diagram illustrating steps performed in a method 1400 for generating an amplified patterned burst-mode beam 112 in accordance with one or more embodiments of the present disclosure. Applicant notes that the embodiments and enabling technologies described previously herein in the context of the burst-mode laser system 100 should be interpreted to extend to the method 1400. It is further noted, however, that the method 1400 is not limited to the architecture of the burst-mode laser system 100.

In one embodiment, the method 1400 includes a step 1402 of generating a pulsed seed beam including one or more laser pulses. For example, the pulsed seed beam may be, but is not required to be, formed by one or more seed lasers 102.

In another embodiment, the method 1400 includes a step 1404 of generating an intermediate patterned burst-mode beam from at least one laser pulse from the pulsed seed beam. For example, the intermediate patterned burst-mode beam may be generated using one or more beamsplitters to split at least one laser pulse from the pulsed seed beam along two or more delay paths and one or more beam combiners to combine light along the two or more delay paths to a common optical path (e.g., beamsplitters arranged to combine light from the two or more delay paths). In this way, the intermediate patterned burst-mode beam may include a series of laser pulses with a selected pattern of inter-pulse spacings associated with the two or more delay paths. Further, the laser pulses in the intermediate patterned burst-mode beam may have a selected pattern of amplitudes (e.g., pulse energies, pulse energy densities, or the like). The selected pattern of amplitudes may be achieved through various techniques including, but not limited to, controlling splitting ratios of any of the constituent beamsplitters or filters (e.g., neutral density filters) in any of the delay paths.

In another embodiment, the method 1400 includes a step 1406 of amplifying the series of laser pulses in the intermediate patterned burst-mode beam with one or more power amplifiers to form an amplified patterned burst-mode beam. In this way, the amplified patterned burst-mode beam includes a series of amplified laser pulses with the selected pattern of inter-pulse spacings. Further, the amplified patterned burst-mode beam may have a selected pattern of amplitudes. In a general sense, the pattern of amplitudes of the amplifier patterned burst-mode beam may be determined by a combination of the amplitudes of the intermediate patterned burst-mode beam and the gain characteristics of the one or more power amplifiers (e.g., the pump power of the one or amplifiers, the timing of pump power provided to the one or more power amplifiers, or the like). In this way, the pattern of amplitudes of the amplifier patterned burst-mode beam may be selected, adjusted, or otherwise controlled by controlling the amplitudes of the intermediate patterned burst-mode beam. For example, operating an amplifier in a non-saturation mode may provide that the amplified patterned burst-mode beam (or a portion thereof amplified by the amplifier) is a scaled version of the intermediate patterned burst-mode beam (or a corresponding portion thereof). By way of another example, operating an amplifier in a saturation mode may provide approximately uniform amplitudes.

In one embodiment, the pulses within the intermediate patterned burst-mode beam are amplified by common gain characteristics or with individually-tuned gain characteristics. For example, the timing and/or amplitude of pump power may be temporally modulated or otherwise controlled to provide a specific amount of gain for any pulse or group of pulses. By way of another example, different amplifiers may be used to amplify different pulses within the intermediate patterned burst-mode beam. Accordingly, it is to be understood that an arbitrary pattern of amplitudes of the amplified patterned burst-mode beam may be obtained through control of the amplitudes of the pulses within intermediate patterned burst-mode beam and the gain applied to those pulses.

It is further contemplated herein a pattern of inter-pulse spacings and/or amplitudes of pulses in the amplified patterned burst-mode beam 112 may be dynamically controlled (e.g., by a controller 132). In this way, various on-target effects disclosed herein may be obtained through a series of output amplified pulse bursts 210.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A laser system comprising:
   one or more seed lasers configured to generate a pulsed seed beam including one or more laser pulses;
   a pulse pattern generator to generate an intermediate patterned burst-mode beam from at least one laser pulse from the pulsed seed beam, wherein the pulse pattern generator includes one or more beamsplitters to split the at least one laser pulse from the pulsed seed beam along two or more delay paths and one or more beam combiners to combine light along the two or more delay paths to a common optical path, wherein the intermediate patterned burst-mode beam includes one or more pulse bursts, wherein each of the one or more pulse bursts includes a series of one or more laser pulses with a selected pattern of inter-pulse spacings associated with the two or more delay paths; and
   one or more power amplifiers to amplify the series of laser pulses in the intermediate patterned burst-mode beam to form an amplified patterned burst-mode beam, wherein the amplified patterned burst-mode beam includes a series of amplified pulse bursts including amplified laser pulses with the selected pattern of inter-pulse spacings.

2. The laser system of claim 1, wherein the series of amplified laser pulses in the amplified patterned burst-mode beam have a selected pattern of pulse energies.

3. The laser system of claim 2, wherein the pulse pattern generator further includes one or more intensity filters in at least one of the two or more delay paths to provide the intermediate patterned burst-mode beam with a scaled version of the selected pattern of pulse energies, wherein the one or more power amplifiers provide uniform amplification of the intermediate patterned burst-mode beam.

4. The laser system of claim 2, wherein the one or more power amplifiers provide a non-uniform amplification of the intermediate patterned burst-mode beam to generate the selected pattern of pulse energies in the amplified patterned burst-mode beam.

5. The laser system of claim 2, wherein at least one of the one or more power amplifiers is configured to provide temporally-modified gain of the amplified patterned burst-mode beam.

6. The laser system of claim 1, wherein a gain profile through the one or more power amplifiers reduces a variation of at least one beam parameter for different amplified laser pulses in the amplified patterned burst-mode beam associated with different delay paths of the two or more delay paths relative to laser pulses in the intermediate patterned burst-mode beam associated with the different delay paths.

7. The laser system of claim 6, wherein the at least one beam parameter comprises:
at least one of a pointing direction, a spot size, or a divergence.

8. The laser system of claim 1, wherein the pulsed seed beam includes laser pulses at a seed repetition rate, wherein the pulse pattern generator comprises:
an envelope shaper to form the intermediate patterned burst-mode beam.

9. The laser system of claim 8, wherein the envelope shaper comprises:
at least one of a pulse picker, a pulse carver, or a pulse shaper.

10. The laser system of claim 8, wherein at least one of the one or more seed lasers comprise:
an oscillator configured to generate seed pulses at the seed repetition rate.

11. The laser system of claim 8, wherein at least one of the one or more seed lasers comprise:
a pulsed laser configured to generate the seed pulses at a fraction of the seed repetition rate; and
a pulse multiplier to provide the seed pulses at the seed repetition rate.

12. The laser system of claim 8, wherein the pulse pattern generator further comprises:
one or more beamsplitters to split the seed beam into the two or more delay paths; and
one or more beam combiners to combine portions of the seed beam in the two or more delay paths into a common coaxial path to form the amplified patterned burst-mode beam.

13. The laser system of claim 12, wherein the two or more delay paths in the pulse pattern generator have different path lengths such that the amplified patterned burst-mode beam includes two or more temporally-offset pulse trains.

14. The laser system of claim 1, wherein the pulse pattern generator includes a pulse multiplier to provide a train of laser pulses having a multiple of a repetition rate of at least one of the one or more seed lasers.

15. The laser system of claim 1, wherein the seed beam includes a single pulse picked from the pulsed seed laser.

16. The laser system of claim 15, wherein the pulse pattern generator further comprises:
one or more beamsplitters to split the seed beam into the two or more delay paths,
one or more beam combiners to combine portions of the seed beam in the two or more delay paths into the intermediate patterned burst-mode beam, wherein the two or more delay paths in the pulse pattern generator have different path lengths, wherein the selected pattern of inter-pulse spacings is based on the different path lengths.

17. The laser system of claim 15, wherein the pulse pattern generator further comprises:
a cavity to generate a train of pulses having an inter-pulse spacing based on a length of the cavity.

18. The laser system of claim 15, wherein the pulse pattern generator further comprises:
an envelope shaper to form the intermediate patterned burst-mode beam.

19. The laser system of claim 18, wherein the envelope shaper comprises:
at least one of a pulse picker, a pulse carver, or a pulse shaper.

20. The laser system of claim 1, further comprising:
one or more pulse shapers to control an intensity of one or more of the amplified laser pulses in the amplified patterned burst-mode beam.

21. The laser system of claim 20, wherein at least one of the one or more pulse shapers comprise:
at least one of an acousto-optical modulator, an electro-optical modulator, or a saturable absorber.

22. The laser system of claim 20, wherein at least one of the one or more pulse shapers comprise:
one or more optical elements to introduce optical loss.

23. The laser system of claim 1, further comprising:
a pulse stretcher located prior to at least one of the one or more power amplifiers; and
a pulse compressor located after the one or more power amplifiers.

24. The laser system of claim 1, wherein at least one of the pulse pattern generator or the one or more power amplifiers are dynamically adjustable to adjust at least one of the selected inter-pulse spacings, a pattern of amplitudes of the laser pulses in the intermediate patterned burst-mode beam, a pattern of amplitudes of the amplified laser pulses in the amplified patterned burst-mode beam, or a number of the amplified laser pulses in a particular amplified pulse burst of the amplified patterned burst-mode beam.

25. The laser system of claim 24, further comprising:
a controller communicatively coupled to at least one of the pulse pattern generator or the one or more power amplifiers, the controller including one or more processors configured to execute program instructions causing the one or more processors to:
receive a selected configuration of the amplified patterned burst-mode beam, the configuration of the amplified patterned burst-mode beam including at least one of the selected pattern of inter-pulse spacings, the pattern of amplitudes of the laser pulses in the intermediate patterned burst-mode beam, the pattern of amplitudes of the amplified laser pulses in the amplified patterned burst-mode beam, or the number of the amplified laser pulses in the particular amplified pulse burst of the amplified patterned burst-mode beam; and
direct, via control signals, at least one of the pulse pattern generator or the one or more power amplifiers to generate the amplified patterned burst-mode beam with the selected configuration.

26. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to generate a selected radio-frequency spectrum at a target in response to illumination with the amplified patterned burst-mode beam.

27. The laser system of claim 26, wherein the selected radio-frequency spectrum comprises:
one or more selected radio-frequency tones.

28. The laser system of claim 26, wherein the selected radio frequency spectrum comprises:
a broadband radio-frequency spectrum including a plurality of selected radio-frequency tones.

29. The laser system of claim 26, wherein the selected pattern of inter-pulse spacings correspond to a Fourier transform of the selected radio-frequency spectrum.

30. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to provide a mass ablation rate of a target above a selected threshold in response to illumination with the amplified patterned burst-mode beam.

31. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to provide an acoustic signal on a target with a selected strength when illuminated by the amplified patterned burst-mode beam.

32. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to provide an acoustic signal on a target with one or more selected audio frequencies when illuminated by the amplified patterned burst-mode beam.

33. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to generate X-ray emission on a target when illuminated by the amplified patterned burst-mode beam.

34. The laser system of claim 1, wherein at least one of the selected pattern of inter-pulse spacings, a pattern of amplitudes of the amplified laser pulses in the amplified patterned burst-mode beam, or a number of the amplified laser pulses in the amplified patterned burst-mode beam are selected to generate broadband optical emission on a target when illuminated by the amplified patterned burst-mode beam.

35. The laser system of claim 1, wherein at least one of the amplified laser pulses in the amplified patterned burst-mode beam has a peak power greater than a known critical value sufficient to produce filamentation in a known atmosphere.

36. The laser system of claim 35, wherein the selected pattern of inter-pulse spacings includes at least one inter-pulse spacing shorter than a known plasma lifetime associated with the filamentation to provide temporal stitching of filaments generated by the amplified patterned burst-mode beam.

37. A method comprising:
generating a pulsed seed beam including one or more laser pulses using one or more seed lasers;
generating an intermediate patterned burst-mode beam from at least one laser pulse from the pulsed seed beam with a pulse pattern generator, wherein the pulse pattern generator includes one or more beamsplitters to split the at least one laser pulse from the pulsed seed beam along two or more delay paths and one or more beam combiners to combine light along the two or more delay paths to a common optical path, wherein the intermediate patterned burst-mode beam includes one or more pulse bursts, wherein each of the one or more pulse bursts includes a series of one or more laser pulses with a selected pattern of inter-pulse spacings associated with the two or more delay paths; and
amplifying the series of laser pulses in the intermediate patterned burst-mode beam with one or more power amplifiers to form an amplified patterned burst-mode beam, wherein the amplified patterned burst-mode beam includes a series of amplified pulse bursts including amplified laser pulses with the selected pattern of inter-pulse spacings.

38. The method of claim 37, wherein generating the intermediate patterned burst-mode beam from the at least one laser pulse from the pulsed seed beam with the pulse pattern generator comprises:
receiving a selected pattern of inter-pulse spacings associated with the intermediate patterned burst-mode beam; and
directing, via one or more control signals, the pulse pattern generator to adjust the two or more delay paths to provide the intermediate patterned burst-mode beam with the selected pattern of inter-pulse spacings associated with the intermediate patterened burst-mode beam.

39. A method comprising:
generating an amplified patterned burst-mode beam including a series of amplified pulse bursts including amplified laser pulses with a selected pattern of inter-pulse spacings, wherein the selected pattern of inter-pulse spacings within at least one of the amplified pulse bursts corresponds to a Fourier transform of a selected radio-frequency spectrum; and
illuminating a target with the amplified patterned burst-mode beam to generate a plasma on the target providing the selected radio-frequency spectrum at the target.

40. The method of claim 39 wherein the selected radio-frequency spectrum comprises:
a selected radio-frequency tone, wherein the selected pattern of inter-pulse spacings corresponds to an inverse of the selected radio-frequency tone.

41. The method of claim 40, wherein the amplified patterned burst-mode beam includes an amplified pulse burst, wherein a number of the amplified laser pulses in the amplified pulse burst is selected to provide a selected bandwidth of the selected radio frequency tone.

42. The method of claim 39 wherein the selected radio-frequency spectrum comprises:
a broadband radio-frequency tone including a plurality of selected radio-frequency tones, wherein the amplified patterned burst-mode beam includes a plurality of pulse trains with the inter-pulse spacings adjusted to be equal to inverses of the plurality of selected radio-frequency tones.

43. The method of claim 39, wherein at least one of the amplified laser pulses in the amplified patterned burst-mode beam have a peak power greater than a known critical value sufficient to produce filamentation.

44. The method of claim 43, wherein the selected pattern of inter-pulse spacings includes at least one inter-pulse spacing shorter than a known plasma lifetime associated with the filamentation to provide temporal stitching of filaments generated by the amplified patterned burst-mode beam.

* * * * *